United States Patent
Nishimura et al.

(10) Patent No.: US 7,151,934 B2
(45) Date of Patent: Dec. 19, 2006

(54) RADIO DATA COMMUNICATIONS METHOD, SERVER, AND RADIO NETWORK CONTROLLER

(75) Inventors: Kenji Nishimura, Yukosuka (JP); Hiroshi Kawakami, Yukosuka (JP); Shoichi Hirata, Fuchu (JP)

(73) Assignee: NTT DoCoMo, Inc., Tokyo (JP)

( * ) Notice: Subject to any disclaimer, the term of this patent is extended or adjusted under 35 U.S.C. 154(b) by 147 days.

(21) Appl. No.: 10/786,289

(22) Filed: Feb. 26, 2004

(65) Prior Publication Data

US 2004/0229649 A1  Nov. 18, 2004

(30) Foreign Application Priority Data

Feb. 26, 2003  (JP)  ............................ P2003-050019

(51) Int. Cl.
*H04Q 7/20* (2006.01)

(52) U.S. Cl. ................ 455/442; 455/436; 455/437; 455/438; 455/439; 455/440; 455/444; 455/445; 370/331; 370/332; 370/335; 370/338; 370/349; 370/350

(58) Field of Classification Search ............ 455/442, 455/450, 436, 437, 438, 439, 444, 447, 502, 455/414.1, 550.1, 552.1, 73, 440, 441, 443, 455/445; 370/338, 352, 401, 324, 331, 336, 370/337, 350, 328, 329, 330, 332, 334, 333, 370/335
See application file for complete search history.

(56) References Cited

U.S. PATENT DOCUMENTS

| | | | | |
|---|---|---|---|---|
| 5,912,886 A | * | 6/1999 | Takahashi et al. | 370/350 |
| 5,920,557 A | * | 7/1999 | Hirata | 370/350 |
| 6,078,813 A | * | 6/2000 | Ljung | 455/436 |
| 6,246,878 B1 | * | 6/2001 | Wallentin | 455/442 |
| 6,373,834 B1 | * | 4/2002 | Lundh et al. | 370/350 |
| 6,577,872 B1 | * | 6/2003 | Lundh et al. | 455/502 |
| 6,668,170 B1 | * | 12/2003 | Costa et al. | 455/439 |
| 6,725,040 B1 | * | 4/2004 | Jiang | 455/436 |

(Continued)

FOREIGN PATENT DOCUMENTS

| | | |
|---|---|---|
| CN | 1284249 C | 2/2001 |
| EP | 1 107 622 | 6/2001 |
| EP | 1 107 622 A1 | 6/2001 |

OTHER PUBLICATIONS

3rd Generation Partnership Project; Technical Specification Group Radio Access Network; Manifestations of Handover and SRNS Relocation (3G TR 25.832 version 3.0.0), pp. 1-13, no date listed.

(Continued)

*Primary Examiner*—Charles Appiah
*Assistant Examiner*—Olumide Ajibade-Akonai
(74) *Attorney, Agent, or Firm*—Oblon, Spivak, McClelland, Maier & Neustadt, P.C.

(57) ABSTRACT

A radio data communications method capable of changing control points located in a network without causing loss of data when a mobile terminal is performing a soft handover. In the radio data communications method in which at least one of a first radio network controller and a second radio network controller performs a soft handover process for allowing a soft handover of a mobile terminal when the mobile terminal is performing soft handover, in downlink radio data communications in which the first radio network controller transmits data to a mobile terminal via a second radio network controller and a base station (or in uplink radio data communications). The first radio network controller or the second radio network controller performing the soft handover process is changed when the mobile terminal is performing the soft handover.

14 Claims, 17 Drawing Sheets

U.S. PATENT DOCUMENTS

| | | | |
|---|---|---|---|
| 6,928,304 B1* | 8/2005 | Wigell et al. | 455/561 |
| 7,085,294 B1* | 8/2006 | Longoni et al. | 370/509 |
| 2001/0034228 A1* | 10/2001 | Lehtovirta et al. | 455/424 |
| 2002/0012321 A1* | 1/2002 | Rune et al. | 370/252 |
| 2002/0049060 A1* | 4/2002 | Grob et al. | 455/442 |
| 2002/0107019 A1 | 8/2002 | Mikola et al. | |
| 2003/0076803 A1* | 4/2003 | Chuah | 370/338 |
| 2004/0214574 A1* | 10/2004 | Eyuboglu et al. | 455/439 |
| 2005/0141477 A1* | 6/2005 | Tomita et al. | 370/349 |

OTHER PUBLICATIONS

3$^{rd}$ Generation Partnership Project; Technical Specification Group Radio Access Network; UTRAN Iub/Iur interface user plane protocol for DCH data streams (Release 1999), pp. 1-33, no month listed.

3$^{rd}$ Generation Partnership Project; Technical Specification Group Radio Access Network; Radio Link Control (RLC) protocol specification (Release 1999), pp. 1-74, no month listed.

* cited by examiner

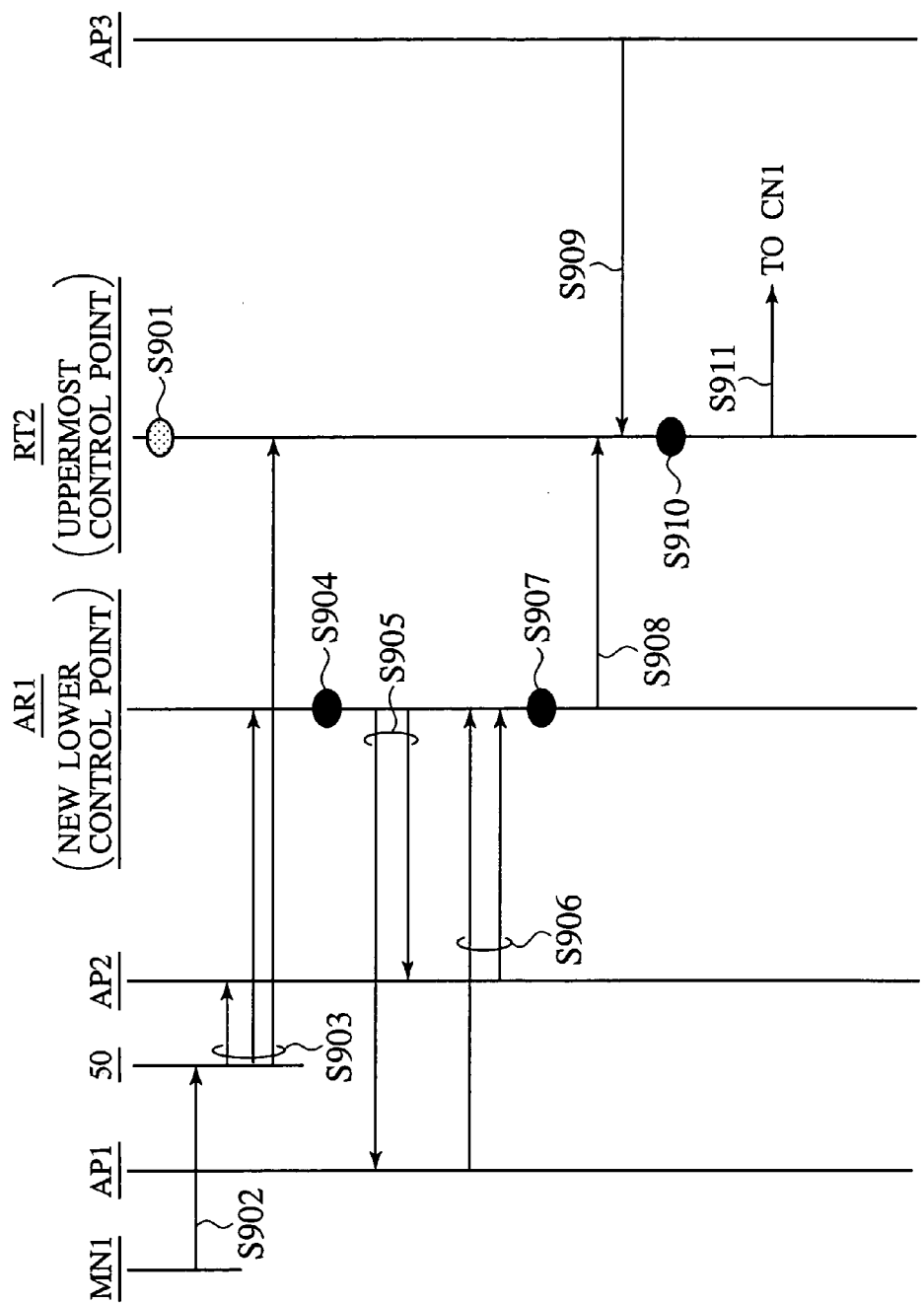

RADIO DATA COMMUNICATIONS METHOD, SERVER, AND RADIO NETWORK CONTROLLER

CROSS REFERENCE TO RELATED APPLICATION

This application is based upon and claims the benefit of priority from the prior Japanese Patent Application No. P2003-050019, filed on Feb. 26, 2003; the entire contents of which are incorporated herein by reference.

BACKGROUND OF THE INVENTION

1. Field of the Invention

The present invention relates to a, radio data communications method, a server, and a radio network controller.

2. Description of the Related Art

The Universal Mobile Telecommunication System (UMTS) has been known as a radio communications system standardized by the 3rd Generation Partnership Project (3GPP).

The UMTS adopts W-CDMA as a radio communication technology, and provides soft handover (diversity handover) as one of handover methods of mobile terminals. The soft handover has an advantage that a mobile terminal can be simultaneously connected to a plurality of base stations for communication, performing a handover without causing loss of data.

With reference to FIGS. 1 to 3, a soft handover process allowing the soft handover of the mobile terminals in the UMTS will be described.

As shown in FIG. 1, a UMTS network consists of a core network including Mobile services Switching Centers (MSCs)/Serving GPRS Support Nodes (SGSNs) and a Gateway MSC (GMSC)/Gateway GPRS Support Node (GGSN), and a Radio Access Network (RAN) including Radio Network Controllers (RNCs) and base station Node Bs.

In the UMTS network, the soft handover process is performed in the RAN.

As shown in FIG. 1, an RNC 1 located in a data transmission/reception path (route) for radio communication started by a mobile terminal MN (Mobile Node) 1 becomes a Serving-RNC (SRNC) for the radio communication of the mobile terminal MN 1, for example. The SRNC performs the soft handover process for the mobile terminal MN 1. Here, there is only a single SRNC for given radio communication.

The soft handover process required for the implementation of soft handover in downlink radio data communications includes as follows:

the measurement of data delays between Node Bs (connecting Nodes B2, B3) to which the mobile terminal MN 1 is connected and the SRNC, that is to say, the process required for the mobile terminal MN 1 to receive data from the plurality of Node B2, B3 simultaneously, or for the arrival synchronization control;

the measurement of timing differences between a clock held by the SRNC and clocks held by the connecting Nodes B2, B3;

the determination and instruction of the timings of transmission from the SRNC to the connecting Nodes B2, B3;

the determination and instruction of the timings of transmission from the connecting Nodes B2, B3 to the mobile terminal MN 1;

the instruction of reception timings from the connecting Nodes B2, B3 to the mobile terminal MN 1;

the division of data in L3 frame format received from the MSC/SGSN into data fragments in L2 frame format;

the provision of sequence numbers required for associating the data fragments (in L2 frame format) with the transmission timings;

the duplication of the data fragments a number of times equal to the number of the connecting Nodes B2, B3; and the transmission of the data fragments based on the transmission timings.

The soft handover process required for the implementation of soft handover in uplink radio data communications includes as follows:

the selective combination of data (in L2 frame format) transmitted from the mobile terminal MN 1 via the connecting Nodes B2, B3;

the control of retransmission in L2 frame unit between the mobile terminal MN 1 and the SRNC when necessary; and the reconstruction control for assembling L2 frame format data fragments after the selective combination (or retransmission control) into L3 frame format data.

With reference to FIGS. 2 and 3, the soft handover process for the mobile terminal MN 1 performed by the RNC 1 as an SRNC in the UMTS network shown in FIG. 1 will be described with an example in which the mobile terminal MN 1 initiates radio data communication and the mobile terminal MN 1 initiates soft handover to the Node B3 (or the mobile terminal MN 1 adds a branch to the Node B3).

First, with reference to FIG. 2, the process in downlink radio data communications will be described.

In step 1001, at the start of radio data communication, the SRNC (i.e., the RNC 1) measures a data delay between the SRNC and the Node B2, and a timing difference between a clock held by the SRNC and a clock held by the Node B2. The measurement may have been performed during the building of the system (hereinafter, the same is true).

In step 1002, the SRNC determines the timing of transmission from the SRNC to the Node B2 (at what value of the clock of the SRNC, what sequence number of data is to be transmitted), the timing of transmission from the Node B2 to the mobile terminal MN 1 (at what value of the clock of the Node B2, what sequence number of data is to be transmitted), and the timing of reception by the mobile terminal MN 1 (at what value of the clock given by the Node B2, what sequence number of data is to be received).

In step 1003, the SRNC notifies the mobile terminal MN 1 of the timing of reception by the mobile terminal MN 1. In step 1004, the SRNC notifies the Node B2 of the timing of transmission from the Node B2 to the mobile terminal MN 1.

In step 1005, the SRNC receives data in L3 frame format from the MSC/SGSN 1, and in step 1006, the SRNC divides the L3 frame format data into L2 frame format data fragments, and provides a sequence number to each data fragment.

In step 1007, the SRNC transmits the data fragments (in L2 frame format) to the Node B2 at the timing of transmission from the SRNC to the Node B2 determined in step 1002. In step 1008, the Node B2 transmits the data fragments (in L2 frame format) to the mobile terminal MN 1 at the timing of transmission from the Node B2 to the mobile terminal MN 1 given in step 1004.

Then, in step 1011, when adding a branch to the Node B3, the mobile terminal MN 1 monitors the radio environment between the mobile terminal MN 1 and the Node B3, and detects that the radio environment between the mobile terminal MN 1 and the Node B3 becomes better. In step 1012, the mobile terminal MN 1 reports the fact to the SRNC.

In step 1013, the mobile terminal MN 1 measures a timing difference between the clock given by the Node B2 and the clock given by the Node B3, and notifies the SRNC of it.

In step 1014, the SRNC measures a data delay between the SRNC and the Node B3 and a timing difference between the clock held by the SRNC and the clock held by the Node B3.

In step 1015, based on the measurement, the SRNC determines the timing of transmission from the Node B3 to the mobile terminal MN 1 and the timing of transmission from the SRNC to the Node B3 such that the mobile terminal MN 1 can receive the same data from the Node B2 and the Node B3 at the same timing.

In step 1016, the SRNC notifies the Node B3 of the timing of transmission from the Node B3 to the mobile terminal MN 1.

In step 1017, the SRNC receives data in L3 frame format from the MSC/SGSN 1, and in step 1018, the SRNC divides the L3 frame format data into L2 frame format data fragments, provides sequence numbers to the data fragments based on a sequence number providing status, and generates two sets of the data fragments by duplication for transmitting the data fragments to the Node B2 and the Node B3.

In step 1019, the SRNC transmits the two sets of data fragments (in L2 frame format) to the Node B2 and the Node B3 at the above transmission timings, respectively. In step 1020, the Node B2 and the Node B3 transmit the data fragments to the mobile terminal MN 1 at the above transmission timings, respectively.

As a result, the mobile terminal MN 1 can receive the same data from the Node B2 and the Node B3 simultaneously.

Second, with reference to FIG. 3, the process in uplink radio data communications will be described.

In steps 1101a and 1101b, at the start of radio data communication, data in L2 frame format transmitted from the mobile terminal MN 1 is transmitted only through the Node B2 to the SRNC. Here the mobile terminal MN 1 divides L3 frame format data into L2 frame format data fragments, and provides a sequence number to each data fragment for transmission.

In step 1102, the SRNC performs retransmission control on the data received via the Node B2, between the SRNC and the mobile terminal MN 1 when necessary.

In step 1103, the SRNC assembles the L2 frame format data fragments so as to reconstruct original L3 frame format data, and in step 1104, the SRNC transmits the reconstructed L3 frame format data to the MSC/SGSN 1.

Then, in steps 1111 and 1112, when the mobile terminal MN 1 adds a branch to the Node B3, L2 frame format data from the mobile terminal MN 1 is transmitted to the SRNC via the Node B2 and the Node B3.

In step 1113, the SRNC performs a selective combination of the received L2 frame format data (data fragments) having the same sequence numbers, and if necessary, performs retransmission control between the SRNC and the mobile terminal MN 1, and assembles the selectively combined L2 frame format data fragments so as to reconstruct original L3 frame format data.

In step 1114, the SRNC transmits the reconstructed L3 frame data to the MSC/SGSN 1.

As a result, data from the Node B2 and the Node B3 can be put together for transmission to a corresponding node CN 1.

As described above, in the conventional UMTS, the soft handover process is fixedly performed at a single SRNC, and the SRNC performing the soft handover process is not changed during the radio data communication.

When the mobile terminal MN 1 performs a handover across RNCs, a subscriber's line extension system is adopted, and data transmission and reception to and from Node Bs is always performed via an SRNC.

In FIG. 1, downlink data and uplink data between the RNC 1 as an SRNC and the Node B3 is transmitted and received via the MSC/SGSN 1 and the RNC 2, for example. The RNC 2, however, only relays the data, and the soft handover process is still performed only by the RNC 1 as an SRNC.

The above-described conventional art, however, has a problem in that it does not specify a method of taking over control for relocating a control point (SRNC) during communication under soft handover. This is because, in the UMTS, it is determined that only one of RNCs in a network having a hierarchical configuration performs a soft handover process, and the RNC performing the soft handover process is not changed during communication.

In the UMTS, an "SRNC Relocation" method is specified as a method of switching data transmission and reception paths during communication.

The "SRNC Relocation" method, however, is not for soft handover, and has a problem of possibly causing loss of data during switching of data transmission and reception paths.

Suppose, for example, that it is possible to construct a flat network (router network) in which there is no distinction between exchanges and RNCs for a mobile communications network as an IP network, and to perform a soft handover process at any control point in the network.

When, for example, there occurs an alternating path including a redundant part like a path "A" shown in FIG. 1 in the subscriber's line extension method, it is very effective in terms of effective use of network resources to switch a point (control point) for switching a data transmission and reception path to a location corresponding to the MSC/SGSN 1, so as to optimize the path. However, as described above, in the UMTS, it is impossible to optimize the path like that.

BRIEF SUMMARY OF THE INVENTION

The present invention has been made in view of the above problems, and has an object of providing a radio data communications method, a server and a radio network controller which allow a change of control points located in a network without causing loss of data when a mobile terminal is performing soft handover.

A first aspect of the present invention is summarized as a radio data communications method in which at least one of a first radio network controller and a second radio network controller performs a soft handover process for allowing soft handover of a mobile terminal, when the mobile terminal is performing the soft handover, in downlink radio data communications in which the first radio network controller transmits data to the mobile terminal via the second radio network controller and a base station. The soft handover process includes the steps of: (A) determining a first transmission timing of transmitting the data to all base stations to which the mobile terminal is connected when performing the soft handover; (B) dividing the data and providing a sequence number to each of the data fragments; and (C) transmitting the data fragments to all the base stations at the first transmission timing. The radio network controller performing the soft handover process is changed when the mobile terminal is performing the soft handover.

A second aspect of the present invention is summarized as a radio data communications method in which at least one of a first radio network controller and a second radio network controller performs a soft handover process for allowing soft handover of a mobile terminal, when the mobile terminal is performing the soft handover, in uplink radio data communications in which a mobile terminal transmits data to the first radio network controller via a base station and the second radio network controller. The soft handover process includes the steps of: (A) performing selective combining of data fragments from all base stations to which the mobile terminal is connected when performing the soft handover; and (B) reconstructing the data from the selectively combined data fragments. The radio network controller performing the soft handover process is changed when the mobile terminal is performing the soft handover.

A third aspect of the present invention is summarized as a server for controlling a radio data communications method in which at least one of a first radio network controller and a second radio network controller performs a soft handover process for allowing soft handover of a mobile terminal, when the mobile terminal is performing the soft handover, in downlink radio data communications in which the first radio network controller transmits data to the mobile terminal via the second radio network controller and a base station, or in uplink radio data communications in which the mobile terminal transmits data to the first radio network controller via the base station and the second radio network controller. The server includes a determiner, and a notification provider. The determiner is configured to determine a change of the radio network controller performing the soft handover process when the mobile terminal is performing the soft handover, according to a notification from the mobile terminal. The notification provider is configured to notify radio network controllers related to the change of the determination.

A fourth aspect of the present invention is summarized as a radio network controller for performing a soft handover process for allowing soft handover of a mobile terminal, when the mobile terminal is performing the soft handover, in downlink radio data communications in which data is transmitted to the mobile terminal via a base station. The radio network controller includes a notification receiver, a data divider, a sequence number provider, a transmission timing determiner, and a data transmitter. The notification receiver is configured to receive a notification instructing the radio network controller to perform the soft handover process as a first radio network controller. The data divider is configured to divide the data in response to the notification. The sequence number provider is configured to provide a sequence number to each of the data fragments, based on a sequence number providing status, in response to the notification. The transmission timing determiner is configured to determine a first transmission timing of transmitting the data to a base station managed by the radio network controller among base stations to which the mobile terminal is connected when performing the soft handover, and to determine a second transmission timing of transmitting the data to a second radio network controller, in response to the notification. The data transmitter is configured to transmit data fragments to the second radio network controller at the second transmission timing, and to transmit at the first transmission timing the data fragments to the base station managed by the radio network controller among the base stations to which the mobile terminal is connected when performing the soft handover, in response to the notification.

A fifth aspect of the present invention is summarized as a radio network controller for performing a soft handover process for allowing soft handover of a mobile terminal, when the mobile terminal is performing soft handover, in downlink radio data communications in which data is transmitted to the mobile terminal via a base station. The radio network controller includes a notification receiver, a transmission timing determiner, and a data transmitter. The notification receiver is configured to receive a notification instructing the radio network controller to perform the soft handover process as a second radio network controller. The transmission timing determiner is configured to determine a first transmission timing of transmitting the data to base stations managed by the radio network controller among base stations to which the mobile terminal is connected when performing the soft handover, in response to the notification. The data transmitter is configured to transmit, at the first transmission timing, data fragments from a first radio network controller to the base stations managed by the radio network controller among the base stations to which the mobile terminal is connected when performing the soft handover, in response to the notification.

A sixth aspect of the present invention is summarized as a radio network controller for performing a soft handover process for allowing soft handover of a mobile terminal, when the mobile terminal is performing the soft handover, in downlink radio data communications in which data is transmitted to the mobile terminal via a base station. The radio network controller includes a notification receiver, and a data transmitter. The notification receiver is configured to receive a notification instructing the radio network controller not to perform the soft handover process. The data transmitter is configured to transfer the data without dividing the data, in response to the notification.

A seventh aspect of the present invention is summarized as a radio network controller for performing a soft handover process for allowing soft handover of a mobile terminal, when the mobile terminal is performing the soft handover, in uplink radio data communications in which the mobile terminal transmits data via a base station. The radio network controller includes a notification receiver, a selective combiner, and a reconstructor. The notification receiver is configured to receive a notification instructing the radio network controller to perform the soft handover process as a first radio network controller. The selective combiner is configured to perform selective combining of data fragments from all base stations to which the mobile terminal is connected when performing the soft handover, in response to the notification. The reconstructor is configured to reconstruct the data from the selectively combined data fragments, in response to the notification.

A eighth aspect of the present invention is summarized as a radio network controller for performing a soft handover process for allowing soft handover of a mobile terminal, when the mobile terminal is performing the soft handover, in uplink radio data communications in which the mobile terminal transmits data via a base station. The radio network controller includes a notification receiver, a selective combiner, and a data transmitter. The notification receiver is configured to receive a notification instructing the radio network controller to perform the soft handover process. The selective combiner is configured to perform a selective combining of data fragments from base stations managed by the radio network controller among all base stations to which the mobile terminal is connected when performing the soft handover, in response to the notification. The data transmitter is configured to transmit the selectively combined data fragments to a first radio network controller in response to the notification.

A ninth aspect of the present invention is summarized as a radio network controller for performing a soft handover process for allowing soft handover of a mobile terminal, when the mobile terminal is performing the soft handover, in uplink radio data communications in which the mobile terminal transmits data via a base station. The radio network controller includes a notification receiver, and a data transmitter. The notification receiver is configured to receive a notification instructing the radio network controller not to perform the soft handover process. The data transmitter is configured to transmit to a first radio network controller data fragments from a base station managed by the radio network controller among all base stations to which the mobile terminal is connected when performing the soft handover, without performing selective combining, in response to the notification.

A tenth aspect of the present invention is summarized as a radio data communications method in which at least one of a first radio network controller and a second radio network controller performs a soft handover process for allowing soft handover of a mobile terminal, when the mobile terminal is performing the soft handover. A radio network controller performing the soft handover process is changed when the mobile terminal is performing the soft handover.

BRIEF DESCRIPTION OF THE SEVERAL VIEWS OF THE DRAWINGS

FIG. 17 is a sequence diagram illustrating a control point changing operation in uplink radio data communications in the radio data communications system according to the embodiment of the present invention.

DETAILED DESCRIPTION OF THE INVENTION

<The Configuration of Radio Data Communicaitons System in a First Embodiment of the Invention>

The configuration of a radio data communications system according to a first embodiment of the present invention will be described with reference to FIGS. 4 to 7. This embodiment will be described with an exemplary radio data communications system adopting a router network as described above.

In the radio data communications system according to this embodiment, when a mobile terminal MN 1 performs soft handover in downlink radio data communications in which a first radio network controller (e.g., a router RT 2) transmits data to the mobile terminal MN 1 via second radio network controllers (e.g., access routers AR 1 and AR 2) and base stations (e.g., access points AP 1 to AP 3), or in uplink radio data communications in which the mobile terminal MN 1 transmits data to the first radio network controller (e.g., the router RT 2) via base stations (e.g., the access points AP 1 to AP 3) and the second radio network controllers (e.g., the access router AR 1 and AR 2), at least one of the first radio network controller (e.g., the router RT 2) and the second radio network controller (e.g., the access router AR 1) performs a soft handover process for allowing soft handover of the mobile terminal MN 1.

The soft handover process for the mobile terminal MN 1 in downlink radio data communications includes the steps of determining a first transmission timing of transmitting data to all base stations (e.g., the access points AP 1 to AP 3) to which the mobile terminal MN 1 is connected when performing the soft handover, dividing the data and providing a sequence number to each data fragment, and transmitting the data fragments to all the base stations (e.g., the access points AP 1 to AP 3) at the first transmission timing.

The soft handover process for the mobile terminal MN 1 in uplink radio data communications includes the steps of performing selective combining of data fragments sent from all base stations (e.g., the access points AP 1 to AP 3) to which the mobile terminal MN 1 is connected when performing the soft handover, and reconstructing data from the selectively combined data fragments.

In the radio data communications system according to this embodiment, when the mobile terminal MN 1 is performing the soft handover, a radio network controller performing the soft handover process for the mobile terminal MN 1 is changed.

Figure 1:
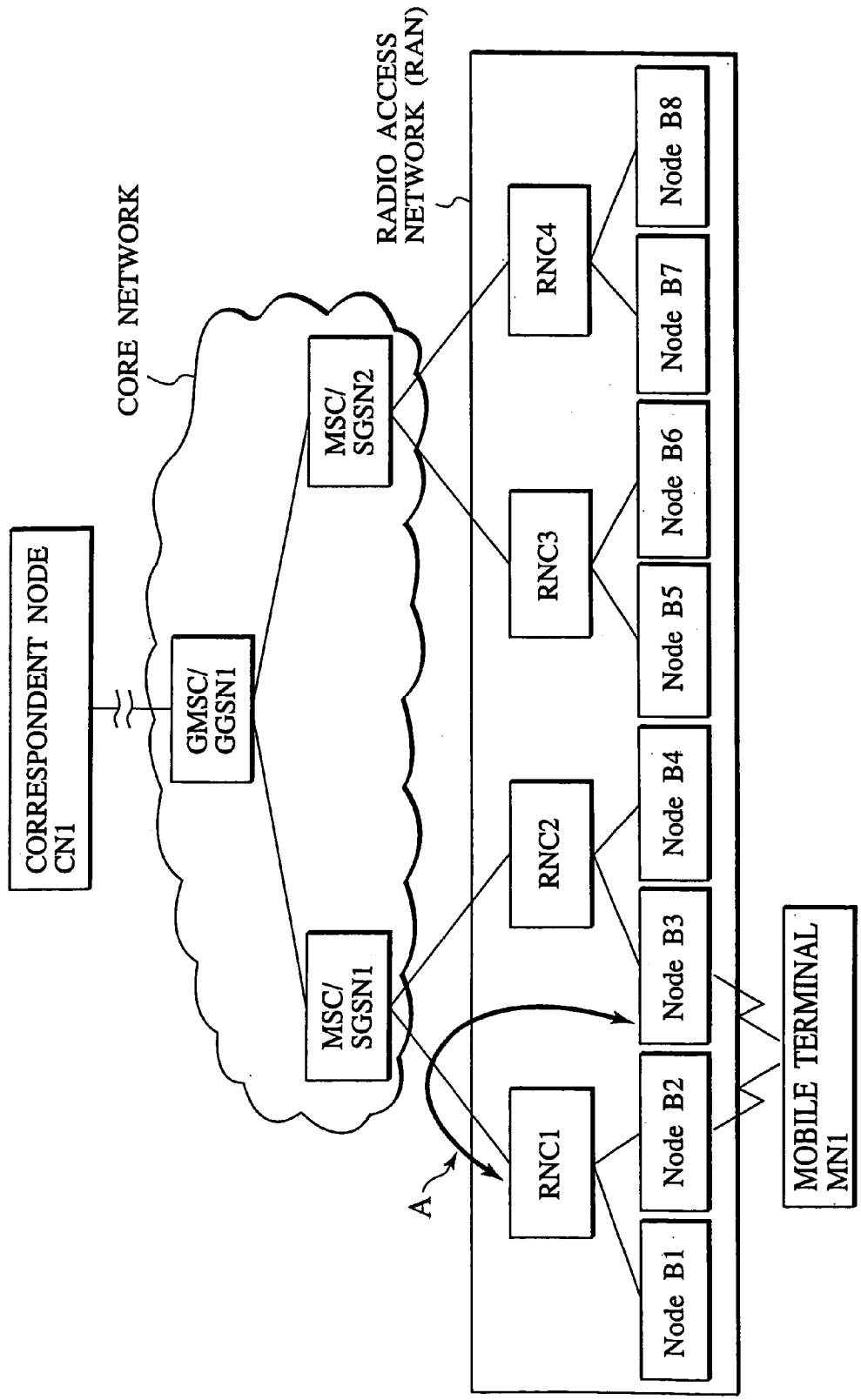
FIG. 1 is an overall block diagram of a radio data communications system according to a conventional art.
Figure 2:
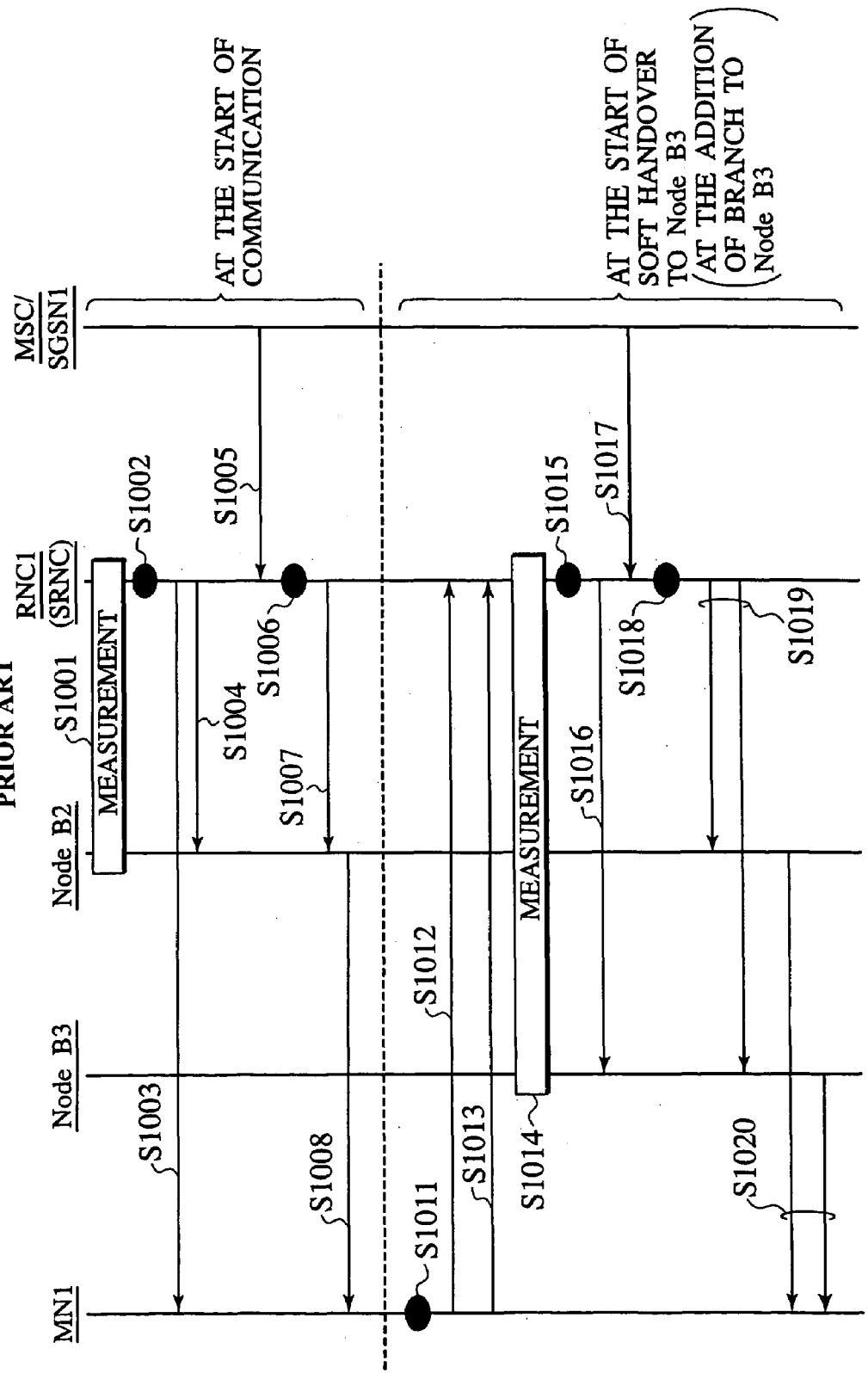
FIG. 2 is a sequence diagram illustrating an operation in downlink radio data communications in the radio data communications system according to the conventional art.
Figure 3:
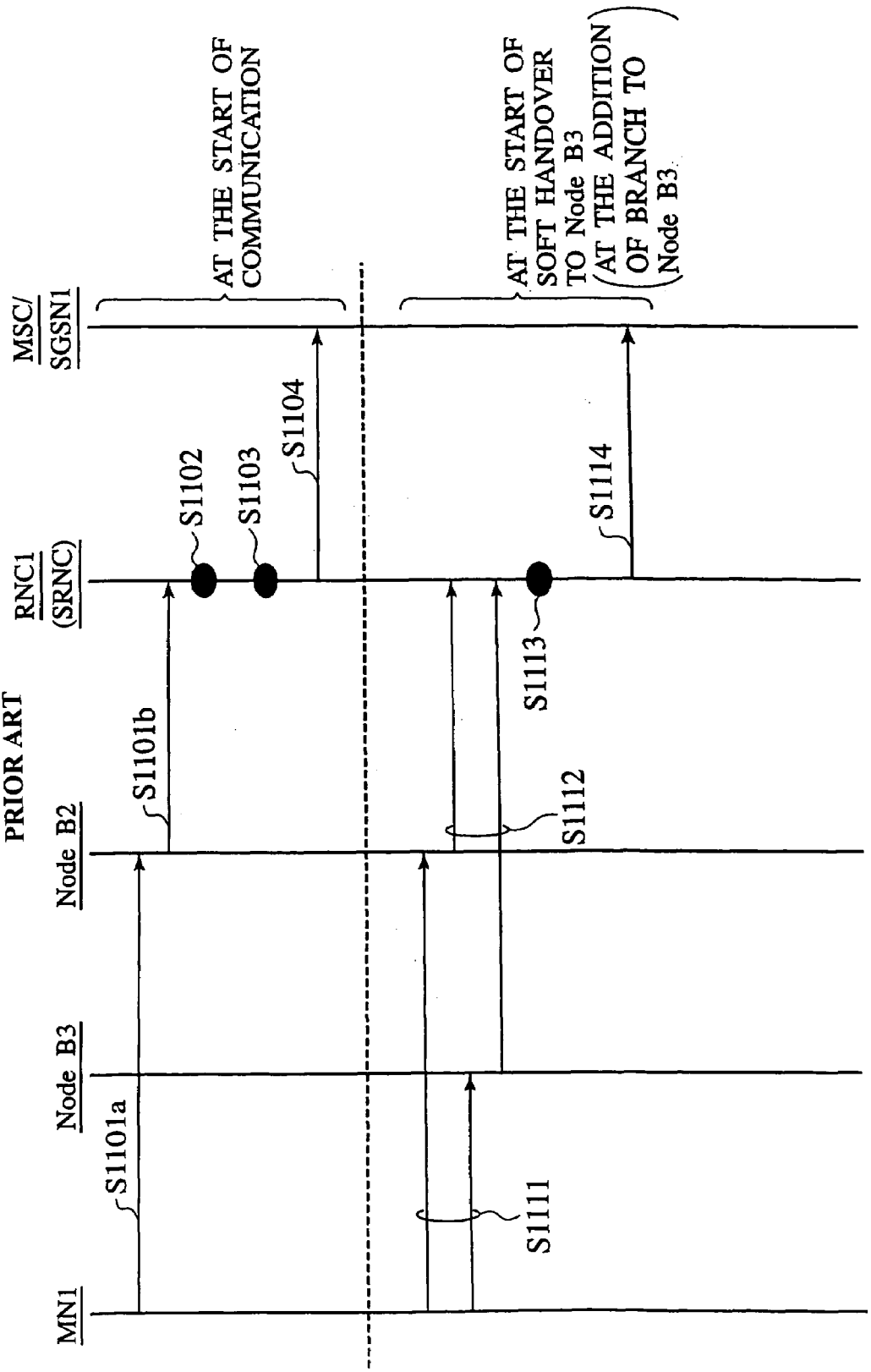
FIG. 3 is a sequence diagram illustrating an operation in uplink radio data communications in the radio data communications system according to the conventional art.
Figure 4:
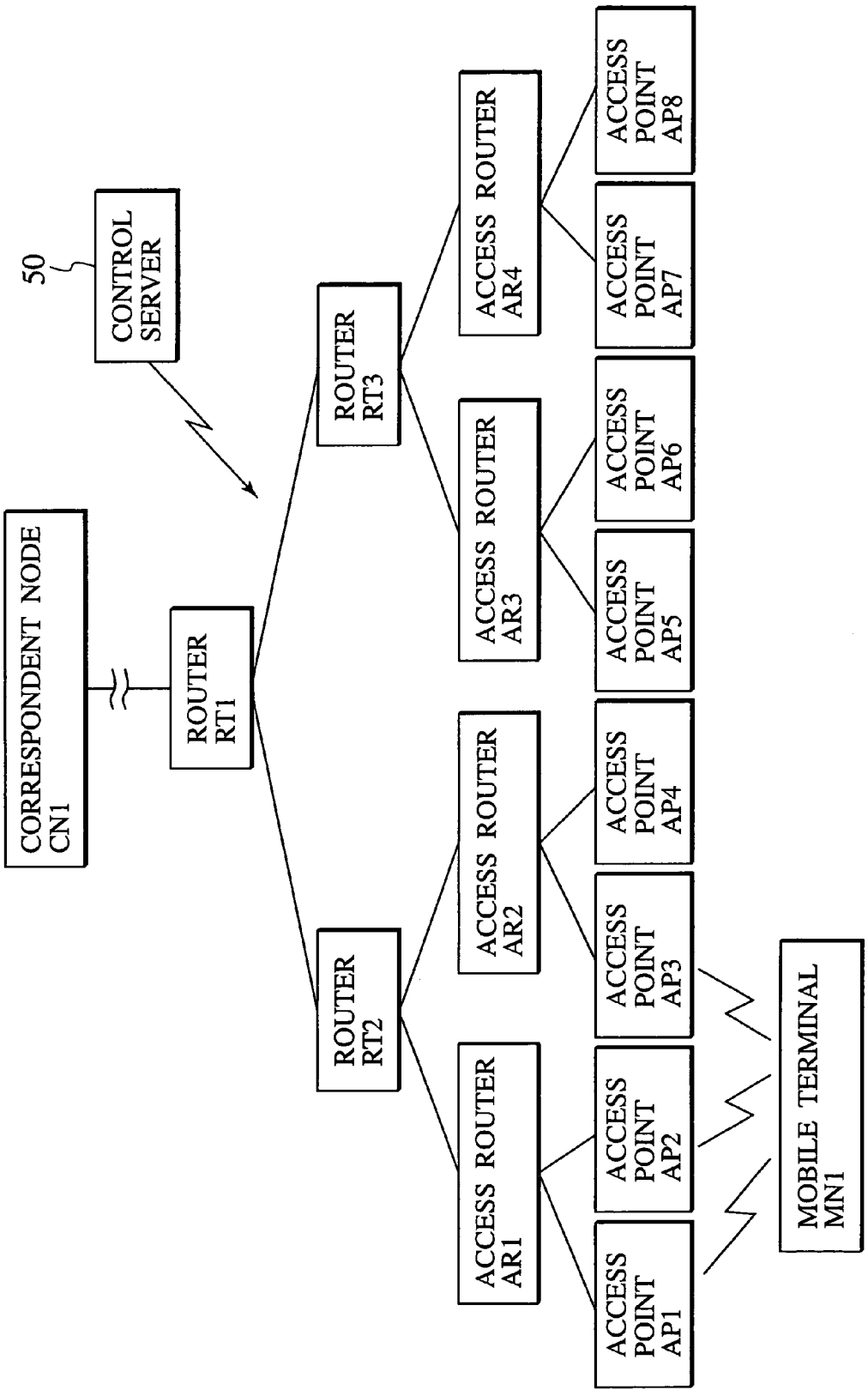
FIG. 4 is an overall block diagram of a radio data communications system according to an embodiment of the present invention.

As shown in FIG. 4, the radio data communications system according to this embodiment has the mobile terminal MN 1, a corresponding node CN 1 of the mobile terminal MN 1, a plurality of routers RT 1 to RT 3, a plurality of access routers AR 1 to AR 4, a plurality of access points AP 1 to AP 8, and a control server 50.

In this embodiment, a network of a tree structure is adopted as a router network. The present invention is not limited thereto and a network of a desired form may be adopted instead.

Figure 5:
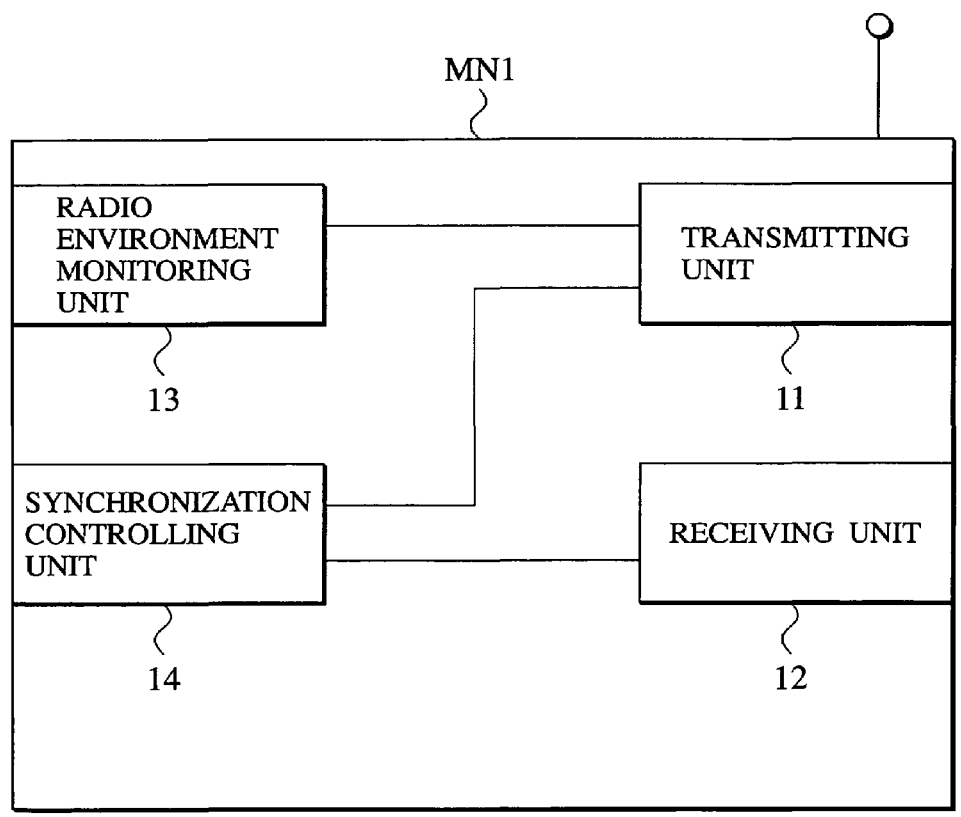
FIG. 5 is a functional block diagram of a mobile terminal in the radio data communications system according to the embodiment of the present invention.

As shown in FIG. 5, The mobile terminal MN 1 includes a transmitting unit 11, a receiving unit 12, a radio environment monitoring unit 13, and a synchronization controlling unit 14. Here, the maximum number of access point APs to which the mobile terminal MN 1 can be connected simultaneously is three, and only one event such as the addition or removal of a branch occurs at a time.

The transmitting unit 11 transmits data in L2 frame format to an access point AP, and notifies the control server 50 of the radio environment between the mobile terminal MN 1 and an access point. The receiving unit 12 receives data in L2 frame format, the reception timing of the data, and so on, from an access point AP.

The radio environment monitoring unit 13 monitors the radio environment between the mobile terminal MN 1 and an access point AP. When detecting that the radio environment between the mobile terminal MN 1 and a given access point AP becomes better or worse, the radio environment monitoring unit 13 notifies the control server 50 of that fact via the transmitting unit 11. The radio environment monitoring unit 13 may be configured to notify the control server 50 of the addition of a branch to a given access point AP or the removal of the branch via the transmitting unit 11.

The synchronization controlling unit 14 controls synchronization between the mobile terminal MN 1 and a given access point AP, an access router AR and/or a router RT based on the reception timing of the data.

The routers RT 1 to RT 3 have the function of exchanges for performing an exchanging process of data in L3 frame format (e.g., IP packets). The access routers AR 1 to AR 4 are routers for accommodating access point APs. For example, the access points AP 1 to AP 8 are radio base stations.

Figure 6:
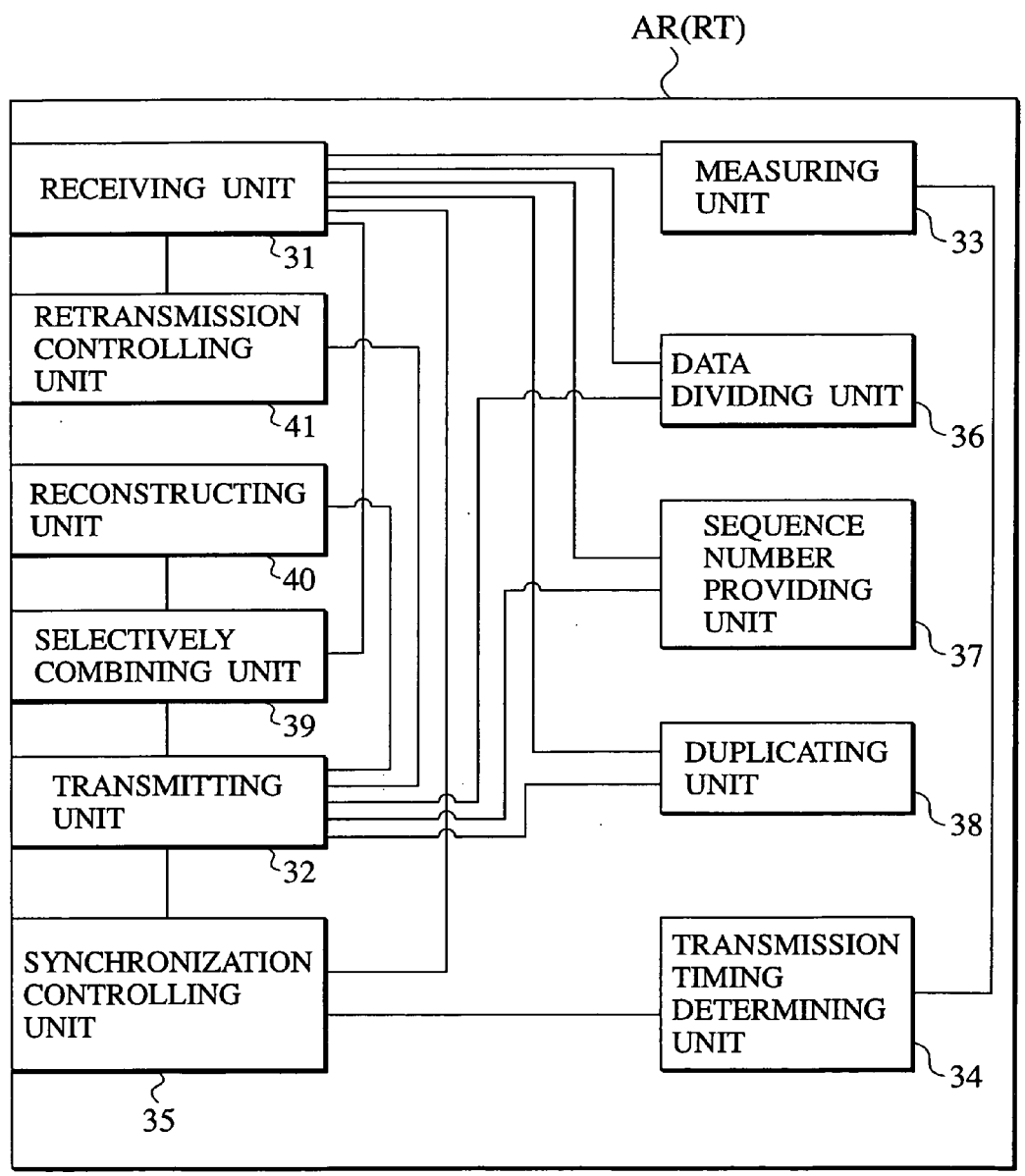
FIG. 6 is a functional block diagram of a router in the radio data communications system according to the embodiment of the present invention.

As shown in FIG. 6, a router RT or an access router AR includes a receiving unit 31, a transmitting unit 32, a measuring unit 33, a transmission timing determining unit 34, a synchronization controlling unit 35, a data dividing unit 36, a sequence number providing unit 37, a duplicating unit 38, a selectively combining unit 39, a reconstructing unit 40, and a retransmission controlling unit 41.

The receiving unit 31 receives downlink data (in L2 frame format or L3 frame format), uplink data (in L2 frame format or L3 frame format), control point change information from the control server 50, synchronization information such as transmission timing, timing difference and data delay, a sequence number, and the like.

That is, the receiving unit 31 serves as a notification receiver configured to receive a notification instructing the router to perform the soft handover process for the mobile terminal MN 1 as a first or second radio network controller (an uppermost control point or a lower control point), or not to perform the soft handover process for the mobile terminal MN 1.

The transmitting unit 32 transmits uplink data (in L2 frame format or L3 frame format), downlink data (in L2 frame format or L3 frame format), synchronization information such as transmission timing, timing difference and data delay, a sequence number and the like.

The measuring unit 33 measures data delay and timing difference between the router and an upper router RT, a lower router RT (access router AR) or an access point AP, when the router serves as a control point.

When control point change information (notification) instructing the first radio network controller (e.g., the router RT 2) to operate as an uppermost control point is received, the transmission timing determining unit 34 provided in the first radio network controller (e.g., the router RT 2) determines a first transmission timing of transmitting, data to a base station (e.g., the access point AP 3) managed by the first radio network controller (e.g., the router RT 2) among base stations (e.g., the access points AP 1 to AP 3) to which the mobile terminal MN 1 is connected when performing soft handover, and a second transmission timing of transmitting data to the second radio network controller (e.g., the access router AR 1) operating as a lower control point.

When control point change information (notification) instructing the second radio network controller (e.g., the access router AR 1) to operate as a lower control point is received, the transmission timing determining unit 34 provided in the second radio network controller (e.g., the access router AR 1) determines a first transmission timing of transmitting data to base stations (e.g., the access points AP 1 and AP 2) managed by the second radio network controller (e.g., the access router AR 1) among base stations (e.g., the access points AP 1 to AP 3) to which the mobile terminal MN 1 is connected when performing soft handover.

When the radio network controller operates as a control point, the synchronization controlling unit 35 controls synchronization between the radio network controller and an upper or lower router RT (access router AR) and the mobile terminal MN 1, based on synchronization information such as transmission timing, data delay and timing difference.

In this embodiment, when control point change information (notification) instructing the first radio network controller (e.g., the router RT 2) to operate as an uppermost control point is received, the transmitting unit 32 and the synchronization controlling unit 35 provided in the first radio network controller (e.g., the router RT 2) constitute a data transmitter configured to transmit at the second transmission timing data fragments to the second radio network controller (e.g., the access router AR 1) operating as a lower control point, and also to transmit at the first transmission timing data fragments to a base station (e.g., the access point AP 3) managed by the first radio network controller (e.g., the router RT 2) among base stations (e.g., the access points AP 1 to AP 3) to which the mobile terminal MN 1 is connected when performing soft handover.

In this embodiment, when control point change information (notification) instructing the first radio network controller (e.g., the router RT 2) to operate as an uppermost control point is received and there is no lower control point, the transmitting unit 32 and the synchronization controlling unit 35 provided in the first radio network controller (e.g., the router RT 2) constitute a data transmitter configured to transmit at the first transmission timing data fragments to all base stations (e.g., the access points AP 1 to AP 3) to which the mobile terminal MN 1 is connected when performing soft handover.

When control point change information (notification) instructing the second radio network controller (e.g., the access router AR 1) to operate as a lower control point is received, the transmitting unit 32 and the synchronization controlling unit 35 provided in the second radio network controller (e.g., the access router AR 1) constitute a data transmitter configured to transfer at the first transmission timing data fragments transmitted from the first radio network controller (e.g., the router RT 2) to base stations (e.g., the access points AP 1 and AP 2) managed by the second radio network controller e.g., the access router AR 1) among base stations (e.g., the access points AP 1 to AP 3) to which the mobile terminal MN 1 is connected when performing soft handover.

When control point change information (notification) instructing the router not to operate as a control point is received, the transmitting unit 32 and the synchronization controlling unit 35 transfer data downward without caring the transmission timing.

When control point change information (notification) instructing the first radio network controller (e.g., the router RT 2) to operate as an uppermost control point is received, the data dividing unit 36 provided in the first radio network controller (e.g., the router RT 2) divides downlink data in L3 frame format into data fragments in L2 frame format. When control point change information (notification) instructing the router not to operate as a control point is received, the data dividing unit 36 stops the data dividing process.

When control point change information (notification) instructing the router to operate as an uppermost control point (the first radio network controller) is received, the sequence number providing unit 37 provides a sequence number to each data fragment (in L2 frame format) based on the sequence number providing status. When control point change information (notification) instructing the router not to operate as a control point is received, the sequence number providing unit 37 stops the sequence number providing process.

When control point change information (notification) instructing the first radio network controller (e.g., the router RT 2) to operate as an uppermost control point is received, the sequence number providing unit 37 provided in the first radio network controller (e.g., the router RT 2) adds information requesting the sequence number providing status (a sequence number providing status notification request bit) to a data fragment for transmission to the second radio network controller (e.g., the access router AR 1), cooperating with the transmitting unit 32.

The sequence number providing unit 37 can take over the sequence number providing status from the second radio network controller (e.g., the access router AR 1) according to a sequence number provided to the data fragment added with the information requesting the sequence number providing status (sequence number providing status notification request bit), given by the second radio network controller (e.g., the access router AR 1), and the number of data fragments having transmitted since the data fragment added with the information requesting the sequence number providing status (sequence number providing status notification request bit) was transmitted, until the sequence number is received.

The duplicating unit 38 performs a duplication process for data fragments a number of times equal to the number of base stations to transmit the data when the router operates as a control point.

When control point change information (notification) instructing the router (e.g., the router RT 2) to operate as an uppermost control point is received, the selectively combining unit 39 performs selective combining of data fragments received from all base stations (e.g., the access points AP 1 to AP 3) to which the mobile terminal MN 1 is connected when performing soft handover.

When control point change information (notification) instructing the router (e.g., the access router AR 1) to operate as a lower control point is received, the selectively combining unit 39 performs selective combining of data fragments received from base stations (e.g., access points AP 1 and AP 2) managed by the router (e.g., the access router AR 1) among all base stations (e.g., the access points AP 1 to AP 3) to which the mobile terminal MN 1 is connected when performing soft handover.

When control point change information (notification) instructing the router not to operate as a control point is received, the selectively combining unit 39 does not perform selective combining of data fragments.

The reconstructing unit 40 reconstructs data in L3 frame format from the selectively combined data fragments (in L2 frame format), when control point change information (notification) instructing the router to operate as an uppermost control point is received.

The reconstructing unit 40 does not reconstruct the data, when control point change information (notification) instructing the router to operate as a lower control point is received or control point change information (notification) instructing the router not to operate as a control point is received.

The retransmission controlling unit 41 performs L2-frame-unit retransmission control between the router and the mobile terminal MN 1, when control point change information. (notification) instructing the router to operate as an uppermost control point is received.

Figure 7:
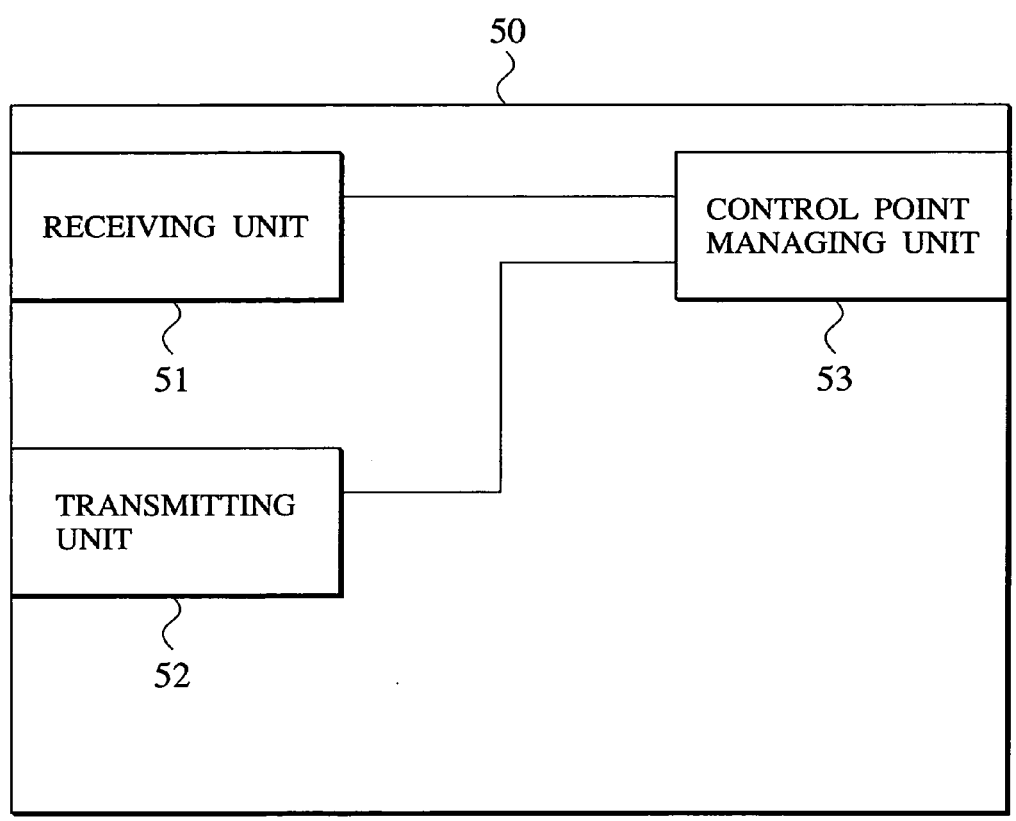
FIG. 7 is a functional block diagram of a control server in the radio data communications system according to the embodiment of the present invention.
Figure 8:
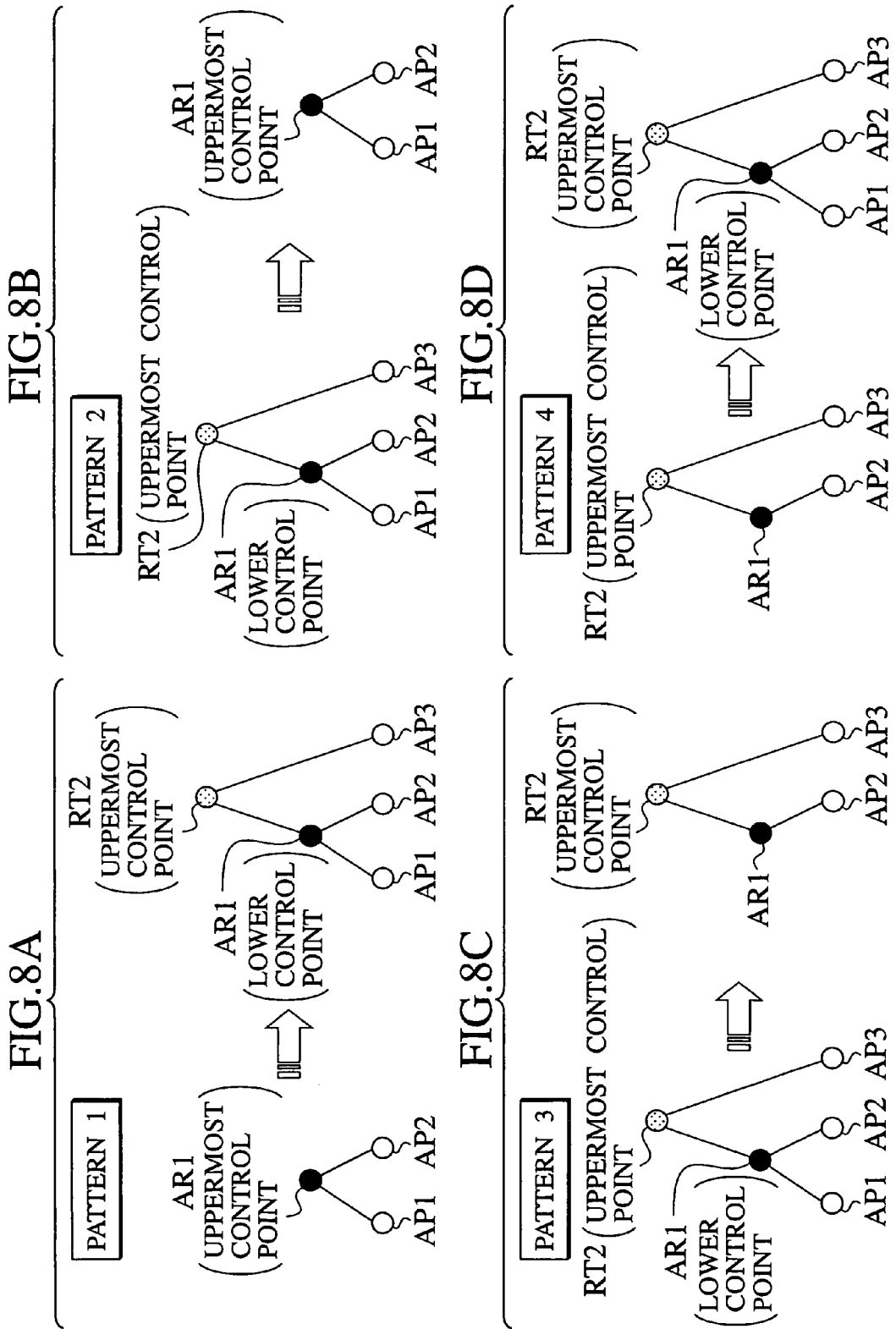
FIGS. 8A to 8D are diagrams illustrating patterns of control point change in the radio data communications system according to the embodiment of the present invention.

The control server 50 is located in the network and connected to devices in the network, performing an auxiliary function for a control point performing the soft handover process in the network. As shown in FIG. 7, The control server 50 includes a receiving unit 51, a transmitting unit 52, and a control point managing unit 53.

The receiving unit 51 receives a radio environment notification from the mobile terminal MN 1. The transmitting unit 52 provides a notification of control point change information generated by the control point managing unit 52 to radio network controllers (e.g., the router RT 2 and the access router AR 1) related to the change.

The control point managing unit 52 generates control point change information based on the radio environment notification. That is, the control point managing unit 52 constitutes a determiner configured to determine a change of radio network controllers for performing the soft handover process for the mobile terminal MN 1, in response to a notification from the mobile terminal MN 1, when the mobile terminal MN 1 is performing soft handover.

<The Operation of the Radio Data Communicaitons System in the Embodiment>

The operation of the radio data communications system according to this embodiment will be described with reference to FIGS. 8A to 17. In the embodiment, description will be made on four patterns of operation of the radio data communications system when changing control points as shown in FIGS. 8A to 8D.

First, with reference to FIGS. 8A to 13, the operation of the radio data communications system in downlink radio communications will be described.

<<Pattern 1>>

As shown in FIG. 8A, in pattern 1, the mobile terminal MN 1 is already connected to the access points AP 1 and AP 2 in the network shown in FIG. 4, and only the access router AR 1 constitutes a control point. The mobile terminal MN 1 then adds a branch to the access point AP 3, so that the router RT 2 is added as a control point (switching to a soft handover process performed by the access router AR 1 and the router RT 2, simultaneously).

In short, in pattern 1, a new control point (router RT 2) is placed above an uppermost control point (access router AR 1) which is uppermost until that time.

Figure 9:
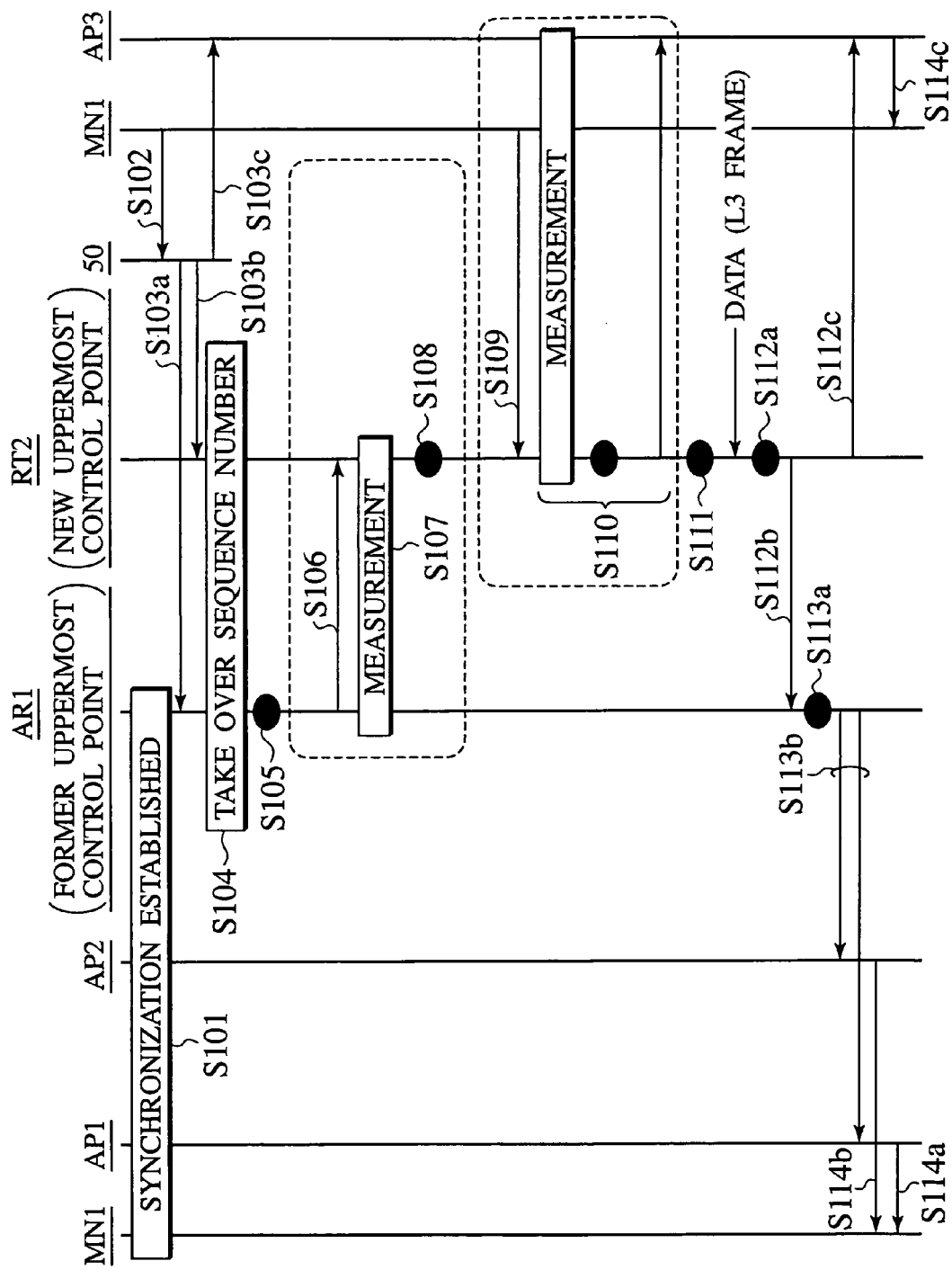
FIG. 9 is a sequence diagram illustrating a control point changing operation in downlink radio data communications in the radio data communications system according to the embodiment of the present invention.

In that case, the radio data communications system in this embodiment can operate as shown in FIG. 9, thereby performing a control point change without causing loss of data.

As shown in FIG. 9, in step 101, a branch to the access point AP 3 has not been added, only the access router AR 1 constitutes a control point, and synchronization is established between the access points AP 1 and AP 2 and the mobile terminal MN 1.

In step 102, the mobile terminal MN 1 detects that the radio environment between the mobile terminal MN 1 and the access point AP 3 becomes better, and notifies the control server 50 of the fact.

Upon the notification, the control server 50 determines the addition of a branch to the access point AP 3 and, as a result of computation determines the addition of the router RT 2, for example, as a control point.

In step 103a, the control server 50 transmits to the access router AR 1 control point change information instructing that the upper router RT 2 becomes a control point. In step 103b, the control server 50 transmits to the router RT 2 control point change information instructing it to become an uppermost control point. In step 103c, the control server 50 transmits to the access point AP 3 control point change information instructing that the router RT 2 becomes its directly upper control point.

In step 104, the router RT 2 (a new uppermost control point), upon receiving the control point change information, performs a process of taking over a sequence number (SN) added to a data fragment from the access router AR 1 (a former uppermost control point). The details will be described below.

In step 105, at the completion of the process of taking over a sequence number in step 104, the router RT 2 transmits to the access router AR 1 data fragments in L2 frame format resulting from the division of data in L3 frame format, added with sequence numbers. At that time, the access router AR 1 stops the sequence number providing process and transmits the data fragments received from the router RT 2 as they are at the existing transmitting timing to the access points AP 1 and AP 2.

In step 106, the access router AR 1 notifies the router RT 2 of synchronization information having been used until that time such as data delays and timing differences (clock timing differences) between the access points AP 1 and AP 2 and the mobile terminal MN 1 and transmission timings.

In step 107, the router RT 2 measures a data delay and a timing difference (clock timing difference) between the router RT 2 and the access router AR 1.

In step 108, the router RT 2 determines the timing of transmission from the router RT 2 to the access router AR 1 based on the measurement in step 107. At that time, the timing of transmission below the access router AR 1, that is, the timing of transmission from the access router AR 1 to the access points AP 1 and AP 2 is not changed.

Instep 109, the mobile terminal MN 1 measures a difference between a clock timing given by the access point AP 1 or AP 2 and a clock timing given by the access point AP 3, and notifies the router RT 2 of the timing difference.

In step 110, the router RT 2 measures a data delay and a timing difference between the router RT 2 and the access point AP 3, and determines the timing of transmission from the access point AP 3 to the mobile terminal MN 1 and the timing of transmission from the router RT 2 to the access point AP 3. Then, the router RT 2 notifies the access point AP 3 of the timing of transmission from the access point AP 3 to the mobile terminal MN 1.

In step 111, at the completion of operation up to step 110, the router RT 2 starts a duplication process of data and a data transmission process (timing transmission process) to the access router AR 1 and the access point AP 3 according to the determined transmission timings, in addition to the data dividing process and the sequence number providing process having been performed up to that time.

The timing transmission process to the access router AR 1 may have been started at the completion of step 108. Also, the transmission process of data fragments may be done by encapsulation in L3 frame (e.g., IP encapsulation) when necessary.

After step 111, when receiving data in L3 frame format from the corresponding node CN 1 via the router RT 1, the router RT 2 performs on the data the process of dividing into data in L2 frame format, the sequence number providing process and the duplicating process, in step 112a.

In step 112b, the router RT 2 performs the process of timing transmission to the access router AR 1, and in step 12c, the router RT 2 performs the process of timing transmission to the access point AP 3.

In step 113a, the access router AR 1, upon receiving the data (in L2 frame format) from the router RT 2, performs the duplicating process, and in step 113b, the access router AR 1 performs the timing transmission process to the access points AP 1 and AP 2.

In step 114, the access points AP 1 to AP 3 perform the process of timing transmission to the mobile terminal MN 1 at the specified transmission timings.

Steps 106 to 108 may be performed in parallel with steps 109 and 110.

Now the sequence number taking over process (step 104) will be described with reference to FIG. 10.

If a sequence number provided at the access router AR 1 as the former uppermost control point is not sequentially followed by a sequence number first provided at the router RT 2 as the new uppermost control point in the sequence number taking over process, the control point change can cause lack of continuity of sequence numbers, largely increasing a data transmission interval, or in the worst case, cause loss of data.

Figure 10:
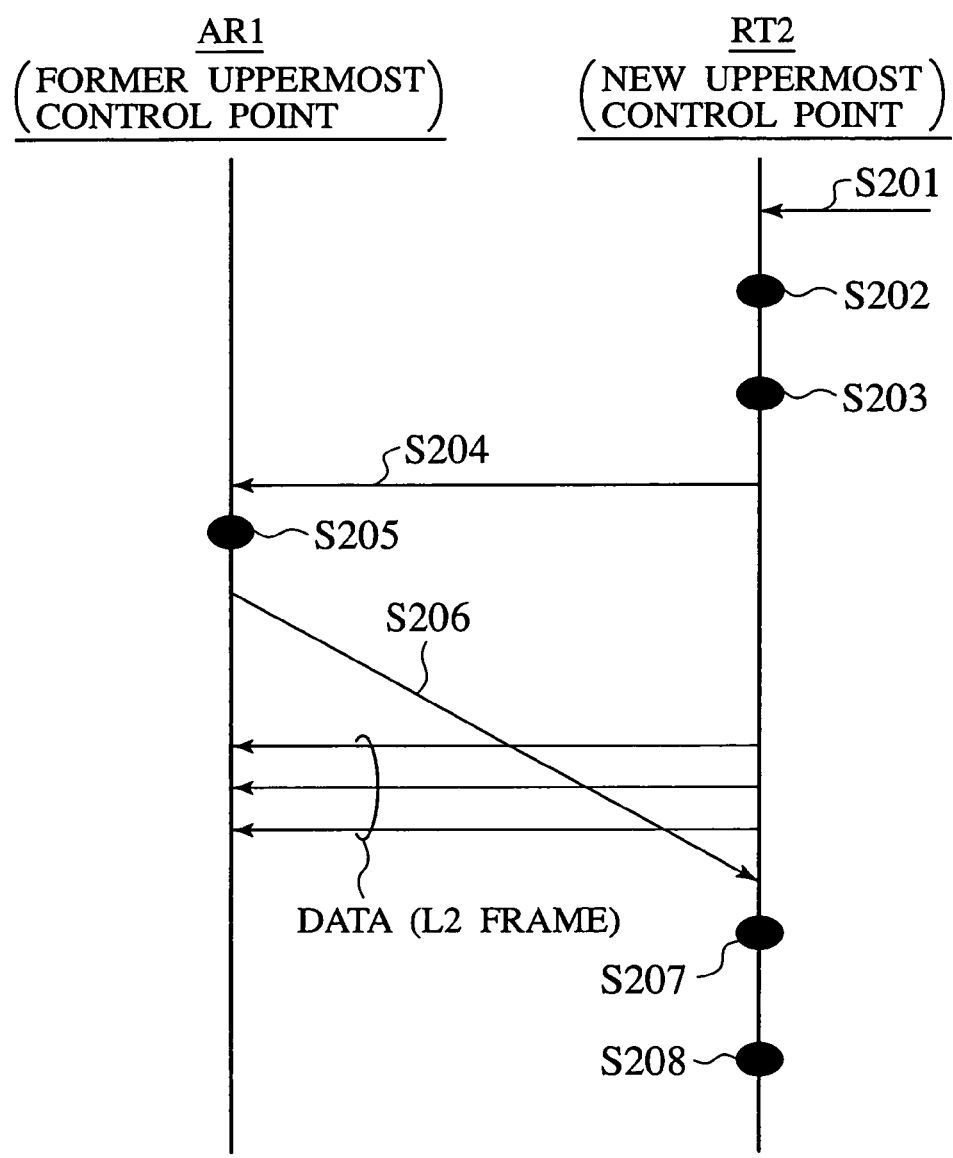
FIG. 10 is a sequence diagram illustrating a sequence number taking-over operation during a control point change in downlink radio data communications in the radio data communications system according to the embodiment of the present invention.

Control as shown in FIG. 10 can avoid the above problems, that is, can allow sequence number taking over with maintained continuity.

As shown in FIG. 10, in step 201, the router RT 2 receives data in L3 frame format from above (e.g., the router RT 1). In step 202, the router RT 2 starts the process of dividing the received data in L3 frame format into data fragments in L2 frame format. The router RT 2, however, does not start the sequence number providing process.

In step 203, the router RT 2 adds to a data fragment information requesting the sequence number providing status. For example, the router RT 2 turns on a sequence number providing status notification request bit provided at the head of a data fragment.

In step 204, the router RT 2 transmits the data fragment to the access router AR 1. Thereafter, before step 207, the router RT 2 performs the data dividing process, and continues the process of data transmission to the access router AR 1, counting the number of data fragments transmitted during that period.

In step 205, the access router AR 1 stops the data dividing process while continuing the provision of sequence numbers following a number provided last to the data fragments (in L2 frame format) received from the router RT 2 for downward transmission. (i.e., to the access points AP 1 and AP 2).

The access router AR 1, when recognizing in step 205 that the sequence number providing status notification request bit is set in the data fragment received from the router RT 2, in step 206, notifies the router RT 2 of a sequence number provided to the first data fragment with the sequence number providing status notification request bit set.

In step 207, the router RT 2 calculates the number of data fragments in L2 frame format transmitted to the access router AR 1 after step 202, and a sequence number to be provided to the next data fragment in L2 frame format to be transmitted to the access router AR 1, based on the sequence number received in step 206.

In step 208, the router RT 2 starts the process of providing sequence numbers to the following data fragments based on the calculation in step 207.

<<Pattern 2>>

As shown in FIG. 8B, in pattern 2, the mobile terminal MN 1 is connected to the access points AP 1 to AP 3 in the network shown in FIG. 4, and the router RT 2 and the access router AR 1 constitute control points. The mobile terminal MN 1 then removes the branch to the access point AP 3, so that the router RT 2 as the control point is removed (switching to a soft handover process performed only by the access router AR 1).

In short, in pattern 2, a control point (access router AR 1) located as a lower control point is changed to an uppermost control point.

Figure 11:
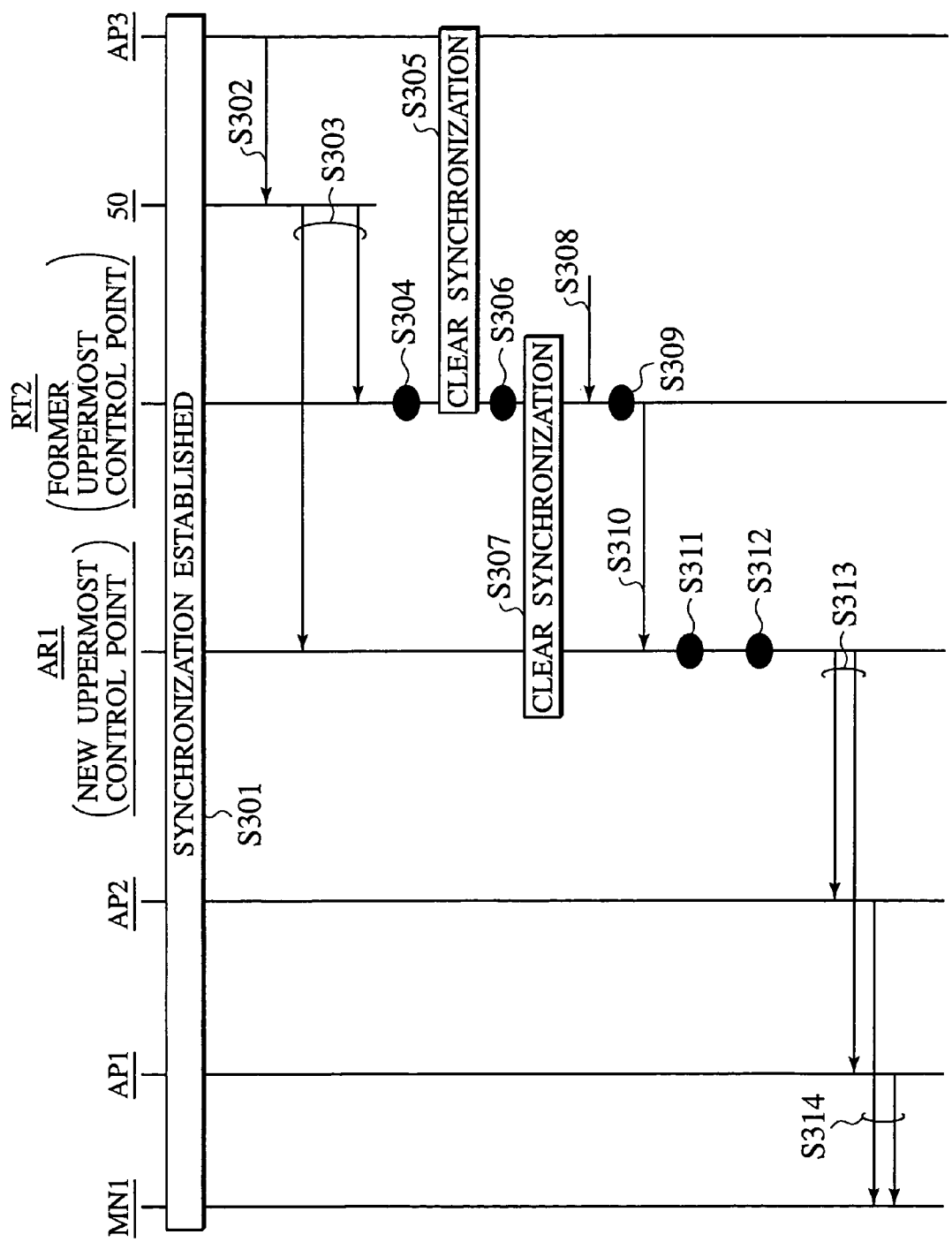
FIG. 11 is a sequence diagram illustrating a control point changing operation in downlink radio data communications in the radio data communications system according to the embodiment of the present invention.

In that case, the radio data communications system according to this embodiment can operate as shown in FIG. 11, thereby performing a control point change without causing loss of data.

As shown in FIG. 11, in step 301, before the removal of the branch to the access point AP 3, synchronization is established among the router RT 2, the access router AR 1 as control points, the access points AP 1 to AP 3 and the mobile terminal MN 1.

In step 302, the access point AP 3 notifies the control server 50 of the removal of the branch from the mobile terminal MN 1 to the access point AP 3, that is, the disconnection between the mobile terminal MN 1 and the access point AP 3. Such notification may be done from the mobile terminal MN 1 to the control server 50 or may be done from the access point AP 3 detecting the disconnection to the control server 50.

Upon the notification, the control server 50 determines the removal of the router RT 2 from the control points, for example, as a result of computation.

In step 303, the control server 50 transmits to the access router AR 1 control point change information to instruct that the upper router RT 2 is removed from the control points and the access router AR 1 becomes an uppermost control point, and transmits to the router RT 2 control point change information to instruct its removal from the control points.

In step 304, upon receiving the control point change information, the router RT 2 (the former uppermost control point) stops the duplicating process and the data transmitting process to the access point AP 3.

In step 305, the router RT 2 releases the hold of information on synchronization with the access point AP 3. In step 306, the router RT 2, which stops, serving as a control point, stops the data dividing process and the sequence number providing process which have been done until that time.

In step 307, the router RT 2 stops the timing transmission process to the access router AR 1 (the new uppermost control point), in other words, only relays (transfers) downlink data to the access router AR 1. The router RT 2 releases the hold of information on synchronization with the access router AR 1 when necessary.

In step 308, the router RT 2 receives data (in L3 frame format) from the corresponding node CN 1, and in step 310, the router RT 2 transfers the data to the access router AR 1 without performing the data dividing process, sequence number providing process, timing transmission process and the like In step 309, in order to avoid the event that data not requiring processing gets ahead of data being processed, reversing the initial order of data during transmission to the access router AR 1, the router RT 2 may perform buffer control such as a queuing process of buffering data not requiring processing until the completion of transmission of data being processed.

In step 311, the access router AR 1 detects that data first received is not subjected to the data dividing process and the sequence number providing process. In step 312, the access router AR 1 performs on the data and data received after the data the data dividing process, providing sequence numbers following a sequence number provided last. As a result, the continuity of sequence numbers can be maintained.

In step 313, the access router AR 1 continuously performs the timing transmission process to the access points AP 1 and AP 2 at the transmission timing used until that time. In step 314, the access points AP 1 and AP 2 continue the timing transmission process at transmission timings used until that time to the mobile terminal MN 1.

<<Pattern 3>>

As shown in FIG. 8C, in pattern 3, the mobile terminal MN 1 is connected to the access points AP 1 to AP 3 in the network shown in FIG. 4, and the router RT 2 and the access router AR 1 constitute control points. The mobile terminal MN 1 then removes a branch to the access point AP 1, so that the access router AR 1 is removed from the control points (that is, switching to a soft handover process performed only by the router RT 2).

In short, in pattern 3, a lower control point (access router AR 1) other than an uppermost control point (router RT 2) is removed from the control points.

Figure 12:
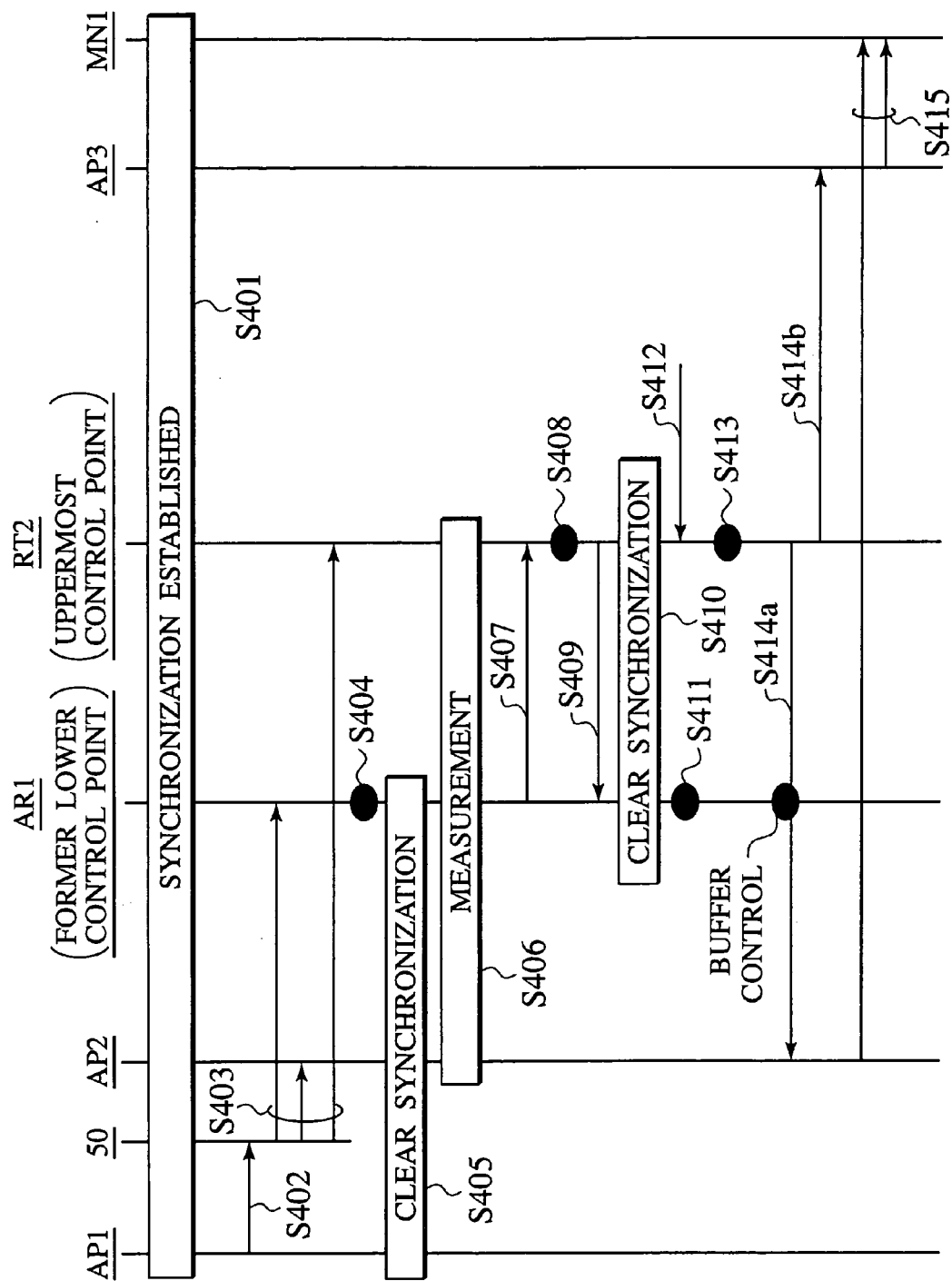
FIG. 12 is a sequence diagram illustrating a control point changing operation in downlink radio data communications in the radio data communications system according to the embodiment of the present invention.

In that case, the radio data communications system according to this embodiment can operate as shown in FIG. 12, performing a control point change without causing loss of data.

As shown in FIG. 12, in step 401, before the removal of the branch to the access point AP 1, synchronization is established among the router RT 2, the access router AR 1 as the control points, the access points AP 1 to AP 3 and the mobile terminal MN 1.

In step 402, the access point AP 1 notifies the control server 50 of the removal of the branch from the mobile terminal MN 1 to the access point AP 1, in other words, the disconnection between the mobile terminal MN 1 and the access point AP 1. Such notification may be done from the mobile terminal MN 1 to the control server 50, or may be done from the access point AP 1 detecting the disconnection to the control server 50.

In step 403, upon the notification, the control server 50 determines the removal of the access router AR 1 from the control points, for example, as a result of computation.

The control server 50 transmits to the access router AR 1 control point change information to instruct its removal from the control points, transmits to the access point AP 2 control point change information to instruct that its directly upper control point is changed to the router RT 2, and transmits to the router RT 2 control point change information to instruct that the lower access router AR 1 is removed from the control points and the access point AP 2 is directly below.

In step 404, upon receiving the control point change information, the access router AR 1 (the former lower control point) stops the duplicating process and the data transmitting process to the access point AP 1.

In step 405, the access router AR 1 releases the hold of information on synchronization with the access point AP 1 when necessary. The access router AR 1, however, continuously performs the timing transmission process to the access point AP 2.

In step 406, upon receiving the control point change information transmitted in step 403, the router RT 2 continuously serving as the uppermost control point measures a data delay and a timing difference between the router RT 2 and the access point AP 2.

In step 407, the access router AR 1 transmits to the router RT 2 synchronization information such as data delay, timing difference and transmission timing used until that time. The router RT 2, if having received such synchronization information, may skip step 407.

In step 408, the router RT 2 determines the timing of transmission to the access point AP 2 based on the measurement in step 406 and the synchronization information in step 407. The timing of transmission from the access point AP 2 to the mobile terminal MN 1 is not changed.

In step 409, the router RT 2 notifies the access router AR 1 of its stopping the timing transmission process to the access router AR 1, and in step 410, releases the hold of information on synchronization with the access router AR 1 when necessary.

In step 411, upon the notification, the access router AR 1 stops the process of timing transmission of data received from the router RT 2 to the access point AP 2, and only relays (transfers) the data to the access point AP 2.

In step 412, the router RT 2 receives data in L3 frame format from above (e.g., the router RT 1), and in step 413, the router RT 2 subjects the received data to the data dividing process, sequence number providing process and duplicating process to the access points AP 2 and AP 3 as done until that time.

In step 414*a*, the router RT 2 performs the process of timing transmission of the data (in L2 frame format) to the access points AP 2, and in step 414*b*, the router RT 2 performs the process of timing transmission of the data (in L2 frame format) to the access points AP 3.

The access router AR 1 may be configured to perform buffer control on data received from the router RT 2 and then transfer the data to the access point AP 2.

In step 415, the access points AP 2 and AP 3 perform the process of timing transmission to the mobile terminal MN 1 at transmission timings used until that time.

<<Pattern 4>>

As shown in FIG. 8D, in pattern 4, the mobile terminal MN 1 is connected to the access points AP 2 and AP 3 in the network shown in FIG. 4, and only the router RT 2 constitutes a control point. The mobile terminal MN 1 then adds a branch to the access point AP 1, so that the access router AR 1 is added as a control point (switching to a soft handover process performed by the router RT 2 and the access router AR 1).

In short, in pattern 4, a new control point (the access router AR 1) is added in a location lower than an uppermost control point (the router RT 2).

Figure 13:
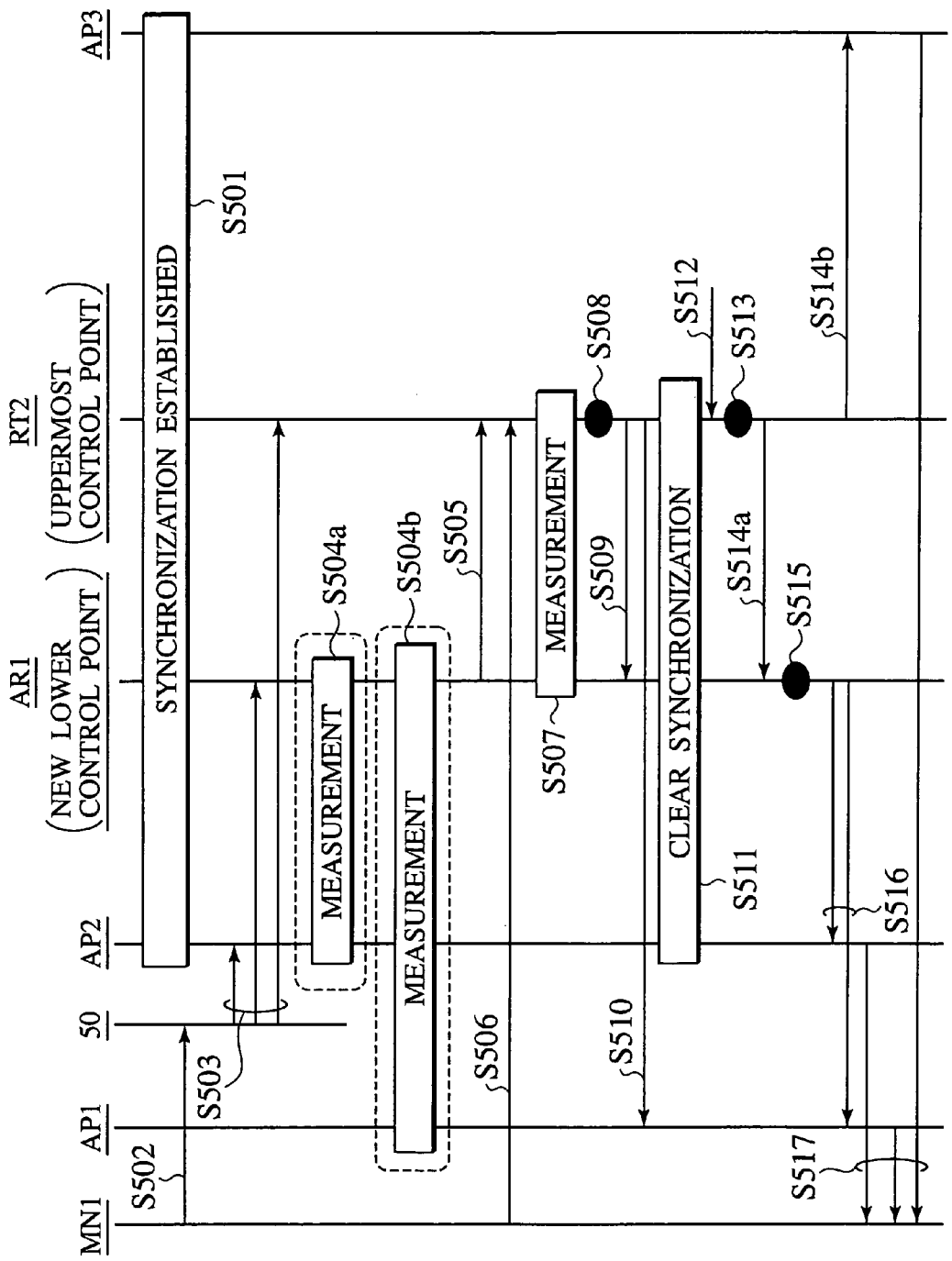
FIG. 13 is a sequence diagram illustrating a control point changing operation in downlink radio data communications in the radio data communications system according to the embodiment of the present invention.

In that case, the radio data communications system according to this embodiment can operate as shown in FIG. 13, thereby performing a control point change without causing loss of data.

As shown in FIG. 13, in step 501, before the addition of a branch to the access point AP 1, synchronization is established among the router RT 2 as the control point, the access points AP 2 and AP 3 and the mobile terminal MN 1.

In step 502, the mobile terminal MN 1 notifies the control server 50 of the fact that a radio environment between the mobile terminal MN 1 and the access point AP 1 becomes better.

In step 503, upon the notification, the control server 50 determines the addition of a branch to the access point AP 1, and, as a result of computation, determines the addition of the access router AR 1 as a control point, for example.

Then, the control server 50 transmits to the access point AP 2 control point change information to instruct that the access router AR 1 becomes its directly upper control point, transmits to the access router AR 1 control point change information to instruct it to become a control point between the access points AP 1 and AP 2 and the router RT 2, and transmits to the router RT 2 control point change information to instruct that the access point AP 2 ceases to be its directly lower access point AP and the access router AR 1 is added as a new lower control point.

Upon receiving the control point change information, the access router AR 1 measures a data delay and a timing difference between the access router AR 1 and the directly lower access points AP 2 in step 504*a*, and measures a data delay and a timing difference between the access router AR 1 and the directly lower access points AP 1 in step 504*b*.

In step 505, the access router AR 1 notifies the router RT 2 of synchronization information including the data delays and timing differences measured in step 504.

In step 506, the mobile terminal MN 1 notifies the router RT 2 of a measured timing difference between a clock given by the access point AP 2 (or the access point AP 3) and a clock given by the access point AP 1.

In step 507, the router RT 2 measures a data delay and a timing difference between the router RT 2 and the access router AR 1.

In step 508, the router RT 2 determines the timing of transmission from the access router AR 1 to the access points AP 1 and AP 2, the timing of transmission from the router RT 2 to the access router AR 1, and the timing of transmission from the access point AP 1 to the mobile terminal MN 1, based on synchronization information used until that time, synchronization information given instep 505, synchronization information (timing difference) given in step 506, and synchronization information measured in step 507.

In step 509, the router RT 2 notifies the access router AR 1 of the timing of transmission from the access router AR 1 to the access points AP 1 and AP 2, and in step 510, the router RT 2 notifies the access point AP 1 of the timing of transmission from the access point AP 1 to the mobile terminal MN 1.

Instep 511, the router RT 2 stops the direct transmission of the following data to the access point AP 1. Specifically, the router RT 2 transmits the following data to the access router AR 1, and the access router AR 1 performs the timing transmission process on the data. The router RT 2 releases the hold of the information on synchronization with the access point AP 1 when necessary.

In step 512, the router RT 2 receives data in L3 frame format from the corresponding node CN 1 via the router RT 1.

In step 513, the router RT 2 subjects the received data to the data dividing process, sequence number providing process using sequence numbers following a number used last, and the duplicating process for the access router AR 1 and the access point AP 3.

In step 514a, the router RT 2 performs on the data (in L2 frame format) the timing transmission process to the access router AR 1, and in step 514b, the router RT 2 performs on the data (in L2 frame format) the timing transmission process to the access point AP 3.

In step 515, the access router AR 1 subjects the data (in L2 frame format) to the duplicating process for the access points AP 1 and AP 2. Then, in step 516, the access router AR 1 performs on the data (in L2 frame format) the timing transmission process to the access points AP 1 and AP 2.

In step 517, the access points AP 2 and AP 3 continuously perform the timing transmission process to the mobile terminal MN 1, and the access point AP 1 performs the timing transmission process based on the given new transmission timing.

Second, with reference to FIGS. 14 to 17, the operation of the radio data communications system in uplink radio communications will be described. Patterns 1 to 4 described below are identical to those in the above-described downlink radio communications.

<<Pattern 1>>

Figure 14:
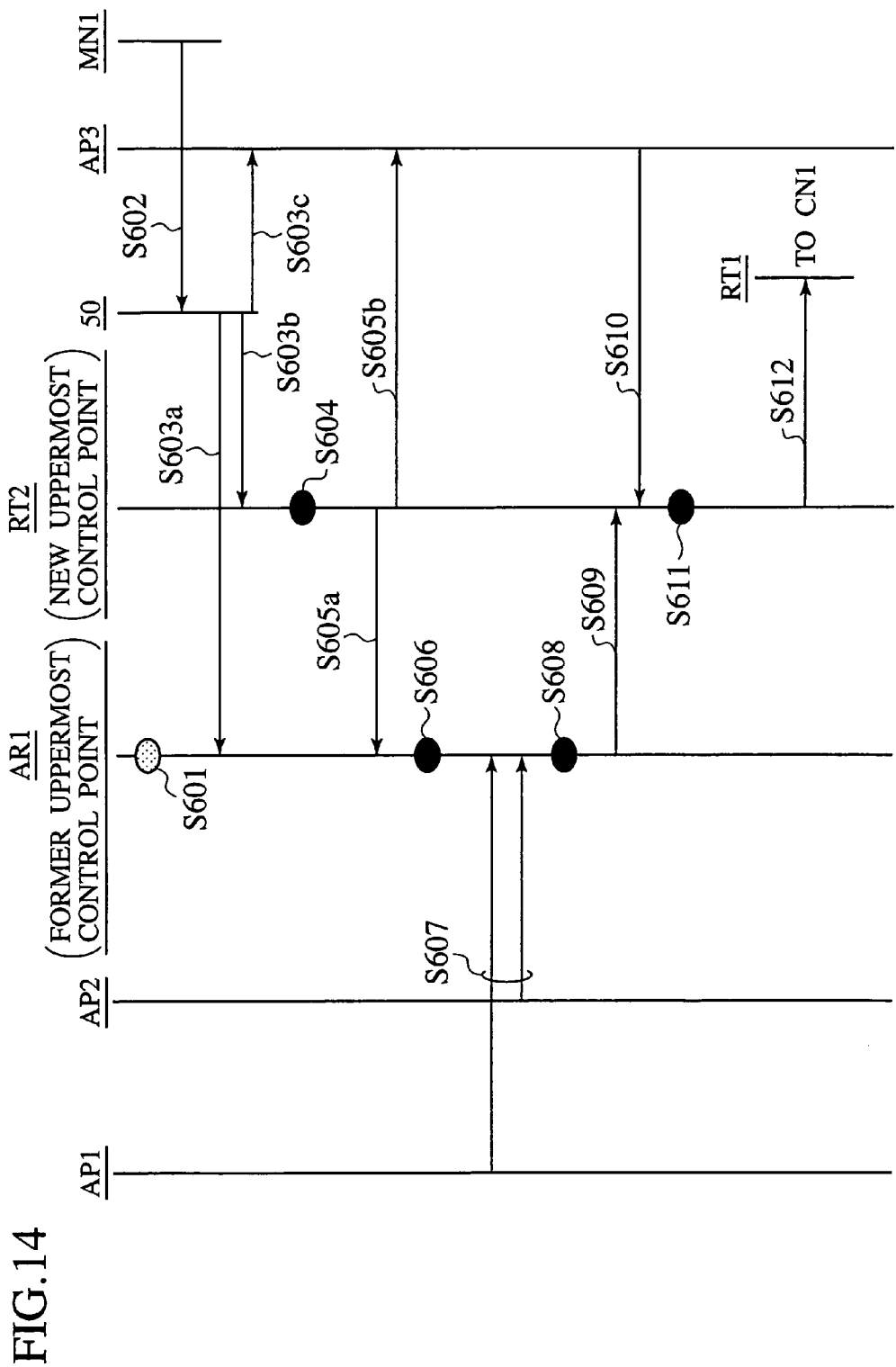
FIG. 14 is a sequence diagram illustrating a control point changing operation in uplink radio data communications in the radio data communications system according to the embodiment of the present invention.

As shown FIG. 14, in step 601, before the addition of a branch to the access point AP 3, only the access router AR 1 constitutes a control point, and the access router AR 1 performs on uplink data (in L2 frame format) from the access points AP 1 and AP 2 the selective combining process, the process of controlling retransmission of the mobile terminal MN 1 (when necessary, the same is true hereinafter), and the process of reconstruction into data in L3 frame format.

In step 602, the mobile terminal MN 1 notifies the control server 50 of the fact that the radio environment between the mobile terminal MN 1 and the access point AP 3 becomes better.

Upon the notification, the control server 50 determines the addition of a branch to the access point AP 3 and, as a result of computation, determines the addition of the router RT 2, for example, as a control point.

Then, the control server 50 transmits to the access router AR 1 control point change information to instruct that the upper router RT 2 becomes a control point in step 603a, transmits to the router RT 2 control point change information to instruct it to become an uppermost control point in step 603b, and transmits to the access point AP 3 control point change information to instruct that the router RT 2 becomes its directly upper control point in step 603c.

In step 604, the router RT 2 (a new uppermost control point), upon receiving the control point change information, starts the selective combining process, retransmission controlling process, and reconstruction controlling process.

In step 605a, the router RT 2 notifies the access router AR 1 (the former uppermost control point) of the start of reception of uplink data (in L2 frame format), and in step 605b, the router RT 2 notifies the access point AP 3 of the start of reception of uplink data (in L2 frame format).

In step 606, the access router AR 1 receiving the notification of the reception start then only continues the selective combining process and stops the retransmission controlling process and the reconstructing process on data in L2 frame format received from the access points AP 1 and AP 2.

In step 607, the access router AR 1 receives data (data fragments) in L2 frame format from the access points AP 1 and AP 2, and in step 608, the access router AR 1 performs the selective combining process on data having the same sequence numbers.

In step 609, the access router AR 1 transmits the selectively combined data in L2 frame format to the router RT 2. At that time, the access router AR 1 performs IP encapsulation or the like on the data when necessary.

In step 610, the router RT 2 receives uplink data (in L2 frame format) from the access point AP 3.

In step 611, the router RT 2 performs the selective combining process on data having the same sequence numbers of data sent from the access router AR 1 and data sent from the access point AP 3, and performs the retransmission controlling process and the reconstructing process on the selectively combined data.

In step 612, the router RT 2 transmits the reconstructed data in L3 frame format to the destination corresponding node CN 1 via the router RT 1.

During steps 604 to 609, in order to prevent double generation of data and loss of data, the following measures can be taken.

The router RT 2 (the new uppermost control point) forwards reconstructed data received from the access router AR 1 (the former uppermost control point) as it is to the corresponding node CN 1.

The router RT 2 (the new uppermost control point) starts the selective combining process, retransmission controlling process and reconstructing process on first data in L2 frame format received from the access router AR 1 (the former uppermost control point), and discards data in L2 frame format received from the access point AP 3 but not received from the access router AR 1.

Such data in L2 frame format has already been reconstructed at the access router AR 1. If the data from the access point AP 3 was also subjected to the reconstructing process, the same L3 frame format data would be double generated.

There is a possibility in that the access router AR 1 (the former uppermost control point), when reconstructing data in L3 frame format in step 606, will transmit the next data in L2 frame format upward (to the router RT 2) before completing the L3 frame format data. To ensure the reconstruction of data in L3 frame format, the following controls are possible, for example.

In a first example, the access router AR 1 (the former uppermost control point) completes the reconstruction of L3 frame format data being reconstructed, and starts transmitting the next data in L2 frame format to the router RT 2 (the new uppermost control point) without performing the reconstructing process thereon.

In a second example, the access router AR 1 (the former uppermost control point) and the router RT 2 (the new uppermost control point) reconstruct respective halves of data in L3 frame format which are then combined together at one of them (e.g., the router RT 2).

<<Pattern 2>>

Figure 15:
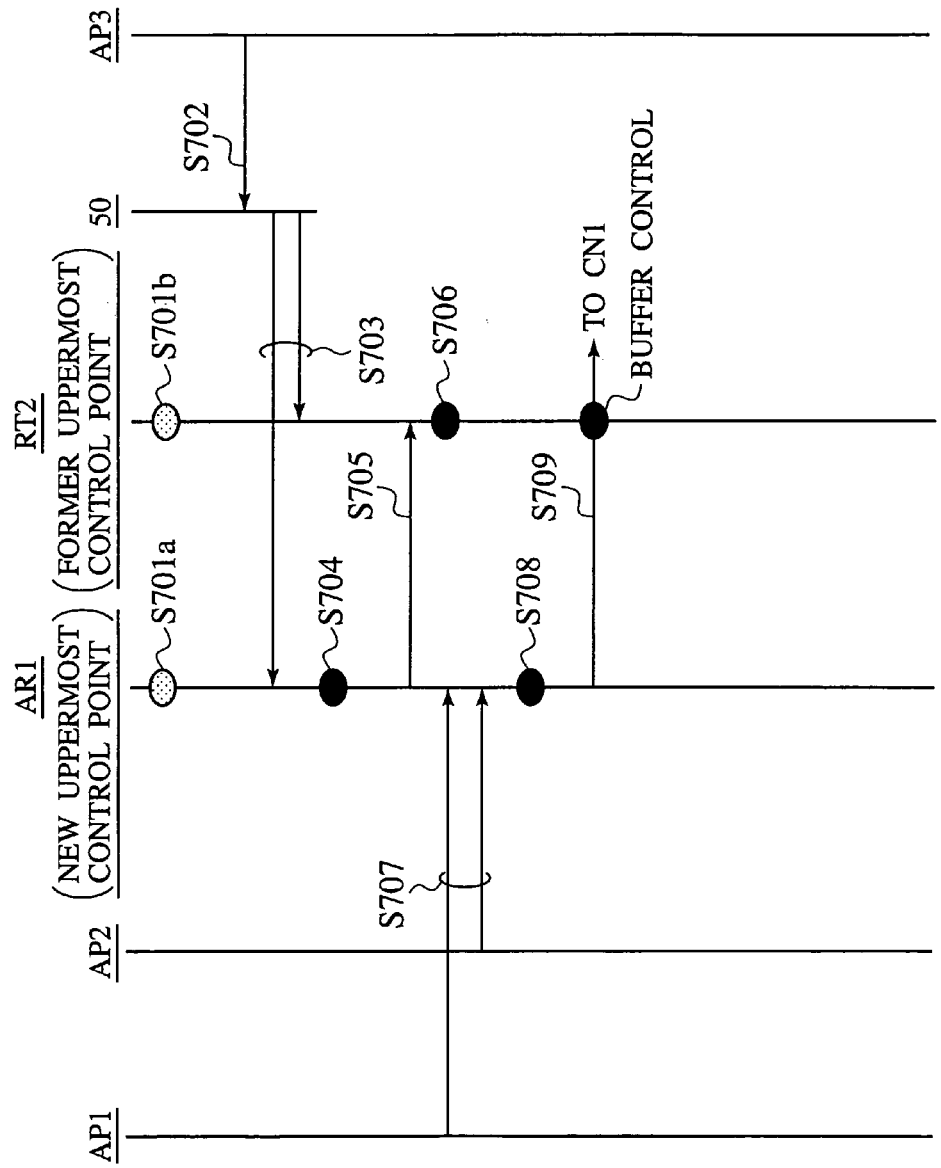
FIG. 15 is a sequence diagram illustrating a control point changing operation in uplink radio data communications in the radio data communications system according to the embodiment of the present invention.

As shown in FIG. 15, in step 701*a*, the access router AR 1 (a lower control point) performs only the selective combining process on L2 frame format data sent from the access points AP 1 and AP 2, and transmits the selectively combined L2 frame format data to the router RT 2 as an upper control point.

In step 701*b*, the router RT 2 (an uppermost control point) performs the selective combining process, retransmission controlling process and reconstructing process on the L2 frame format data sent from the access router AR 1 and the access point AP 3, and transmits the reconstructed L3 frame format data to the corresponding node CN 1.

In step 702, the access point AP 3 notifies the control server 50 of the removal of a branch from the mobile station MN 1 to the access point AP 3. Such notification may be done from the mobile terminal MN 1 to the control server 50 or may be done from the access point AP 3 detecting the disconnection to the control server 50.

Upon the notification, the control server 50 determines the removal of the router RT 2 from the control points, for example, as a result of computation.

In step 703, the control server 50 transmits to the access router AR 1 control point change information to instruct that the upper router RT 2 is removed from the control points and the access router AR 1 becomes an uppermost control point, and transmits to the router RT 2 control point change information to instruct its removal from the control points.

In step 704, upon receiving the control point change information, access router AR 1 (the new uppermost control point) starts the retransmission controlling process and reconstructing process as well as the selective combining process on L2 frame format data from the access points AP 1 and AP 2. In step 705, the router RT 2 (the former uppermost control point) is notified of the fact.

In step 706, the router RT 2 receiving the notification in step 705 stops the selective combining process, retransmission controlling process and reconstructing process, and releases resources for the control. If still receiving L2 frame format data from the access router AR 1, however, the router RT 2 stops these processes after the completion of the processes on the data.

In step 707, the access router AR 1 receives L2 frame format data from the access points AP 1 and AP 2, and in step 708, the access router AR 1 performs the selective combining process, retransmission controlling process and reconstructing process on the received data.

In step 709, the access router AR 1 transmits the reconstructed L3 frame format data to the corresponding node CN 1 via the router RT 2. Here the router RT 2 may be configured to perform buffer control on data from the access router AR 1.

During steps 703 to 709, the router RT 2 (the former uppermost control point), when reconstructing L3 frame format data in step 703, cannot receive the following L2 frame format data, so that there is a possibility in that the L3 frame format data cannot be completed.

In such a case, the access router AR 1 (the new uppermost control point) may reconstruct the L3 frame format data from the middle of the data. To ensure the reconstruction of L3 frame format data, the following controls, for example, are effective.

In a first example, in step 703, the access router AR 1 (the new uppermost control point) determines whether L2 frame format data to transmit is data in the middle of L3 frame format data, and if so, transmits the middle data to the router RT 2 (the former uppermost control point), and starts the reconstructing process using data constituting first part of the following L3 frame format data.

In a second example, the router RT 2 (the former uppermost control point) and the access router AR 1 (the new uppermost control point) reconstruct respective halves of L3 frame format data which are then combined together at one of them (e.g., the router RT 2).

<<Pattern 3>>

Figure 16:
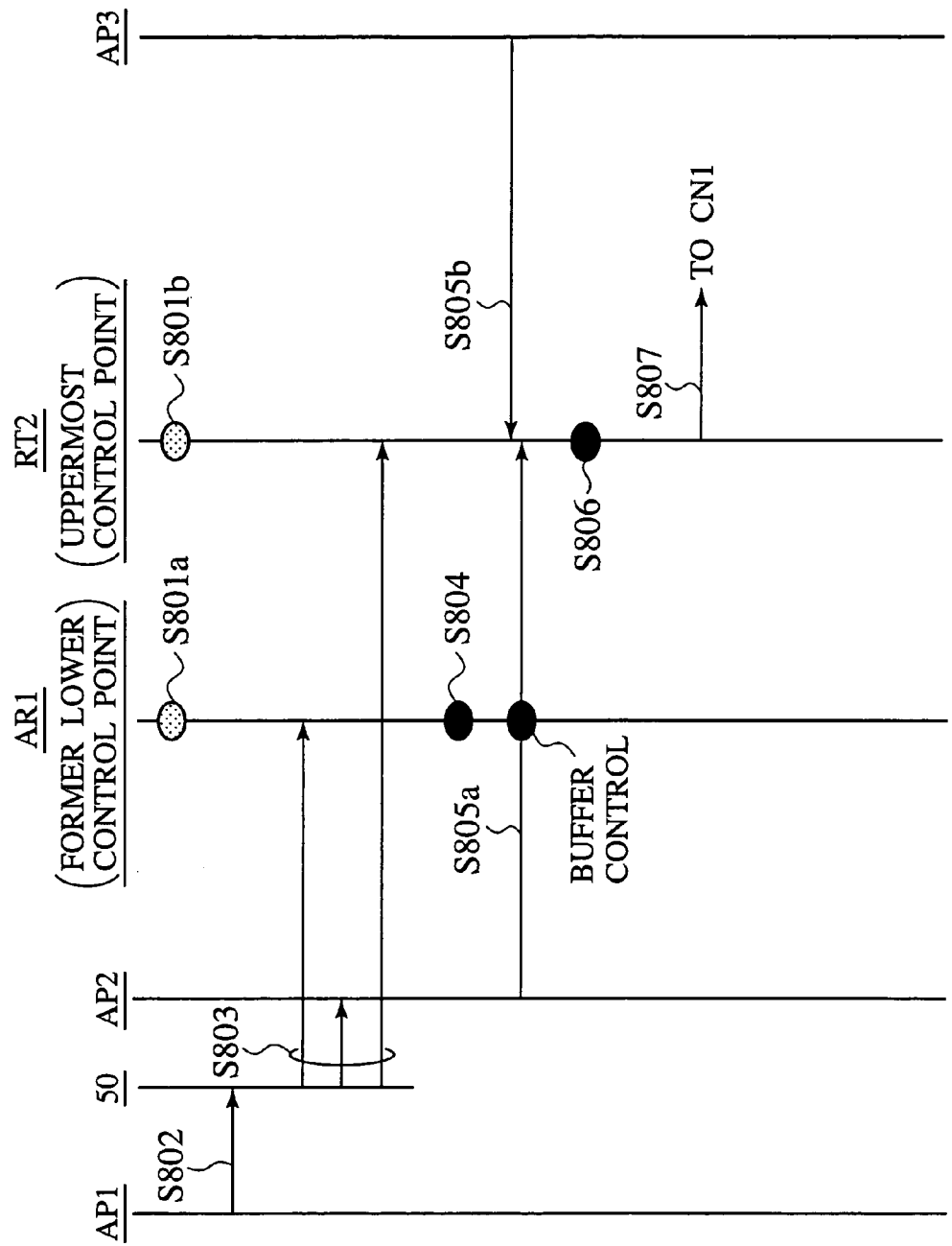
FIG. 16 is a sequence diagram illustrating a control point changing operation in uplink radio data communications in the radio data communications system according to the embodiment of the present invention.

As shown in FIG. 16, in step 801*a*, before the removal of a branch to the access point AP 1, the access router AR 1 as a lower control point performs only the selective combining process on L2 frame format data from the access points AP 1 and AP 2, and transmits the selectively combined L2 frame format data to the router RT 2 as an upper control point.

In step 801*b*, the router RT 2 (an uppermost control point) performs the selective combining process, retransmission controlling process and reconstructing process on L2 frame format data from the access router AR 1 and the access point AP 3, and transmits the reconstructed L3 frame format data to the corresponding node CN 1.

In step 802, the access point AP 1 notifies the control server 50 of the removal of the branch from the mobile station MN 1 to the access point AP 1. Such notification may be done from the mobile terminal MN 1 to the control server 50, or may be done from the access point AP 1 detecting the disconnection to the control server 50.

Upon the notification, the control server 50 determines the removal of the access router AR 1 from the control points, for example, as a result of computation.

In step 803, the control server 50 transmits to the access router AR 1 control point change information to instruct its removal from the control points, transmits to the access points AP 2 control point change information to instruct that its directly upper control point is changed to the router RT 2, and transmits to the router RT 2 control point change information to instruct that the lower access router AR 1 is removed from the control points and the access point AP 2 is directly below.

In step 804, upon receiving the control point change information, the access router AR 1 (the former lower control point) stops the selective combining process on L2 frame format data sent from the access points AP 1 and AP 2. Then, the access router AR 1 relays (transfers) the data to the router RT 2.

In step 805*a*, the router RT 2 receives the L2 frame format data from the access point AP 2 via the access router AR 1, and in step 805*b*, the router RT 2 also receives L2 frame format data from the access point AP 3. Here the access router AR 1 may perform buffer control on the L2 frame format data from the access point AP 2.

In step 806, the router RT 2 continuously performs the selective combining process, retransmission controlling process and reconstructing process on the L2 frame format data received from the access points AP 2 and AP 3.

In step 807, the router RT 2 transmits the completed L3 frame format data to the corresponding node CN 1 via the router RT 1.

<<Pattern 4>>

As shown in FIG. 17, in step 901, before the addition of a branch to the access point AP 1, the router RT 2 as an uppermost control point performs the selective combining process, retransmission controlling process and reconstructing process on L2 frame format data. The access router AR 1 only relays (transfers) L2 frame format data from the access point AP 2 to the router RT 2.

In step 902, the mobile terminal MN 1 notifies the control server 50 of the fact that the radio environment between the mobile terminal MN 1 and the access point AP 1 becomes better.

Upon the notification, the control server 50 determines the addition of the branch to the access point AP 1, and, as a result of computation, determines the addition of the access router AR 1 as a control point, for example.

In step 903, the control server 50 transmits to the access point AP 2 control point change information to instruct that the access router AR 1 becomes its directly upper control point, transmits to the access router AR 1 control point change information to instruct it to become a control point between the access points AP 1 and AP 2 and the router RT 2, and transmits to the router RT 2 control point change information to instruct that the access point AP 2 is not connected directly below and the access router AR 1 is added as a new lower control point.

In step 904, upon receiving the control point change information, the access router AR 1 starts the selective combining process on L2 frame format data from the access points AP 1 and AP 2.

In step 905, the access router AR 1 notifies the access points AP 1 and AP 2 of the start of reception of L2 frame format data.

In step 906, the access router AR 1 receives L2 frame format data from the access points AP 1 and AP 2. In step 907, the access router AR 1 performs only the selective combining process on the received data. In step 908, the access router AR 1 transmits the selectively combined L2 frame format data to the router RT 2 as an upper control point.

In step 909, the router RT 2 continuously receives L2 frame format data also from the access point AP 3.

In step 910, the router RT 2 continuously performs the selective combining process, retransmission controlling process and reconstructing process on the L2 frame format data from the access router AR 1 and the access point AP 3.

In step 911, the router RT 2 transmits the completed L3 frame format data to the corresponding node CN 1 via the router RT 1.

In this embodiment, the maximum number of branches to which the mobile terminal MN 1 can be connected at a time is three, so that the number of control points is maximum two. The present invention, however, is not limited thereto and is applicable to a desired number of branches and a desired number of control points.

Specifically, in the present invention, it is only required to determine whether it is an uppermost control point that is added or removed or the like, and selectively perform the operation of corresponding one of the above-described four patterns.

The present invention can accommodate every control point change pattern by an appropriate combination of the above-described four patterns. For example, when a control point is added or removed in a transition between a one-branch state and a two-branch state, the above combination can accommodate it.

If there is a plurality of control points, a router not serving as a control point may be located in a path therebetween. In that case, the router only relays data.

THE FUNCTION/EFFECT OF THE RADIO DATA COMMUNICATIONS SYSTEM IN THE EMBODIMENT

In the radio data communications system according to the embodiment, a radio network controller (control point) performing the soft handover process for the mobile terminal MN 1 can be changed when the mobile terminal MN 1 is performing soft handover in uplink or downlink radio data communications, thereby to allow the optimization of the data transmission and reception path and an effective use of network resources.

Further, in the radio data communications system according to the embodiment, a control point (first radio network controller) can be placed upstream of the then control point (second radio network controller), or processes performed at a control point (first radio network controller) placed uppermost until that time can be stopped, or processes performed at a control point (second radio network controller) placed downstream of a control point (first radio network controller) placed uppermost until that time can be stopped, or a control point (second radio network controller) can be placed downstream of a control point (first radio network controller) placed uppermost until that time, which results in a more flexible optimization of the data transmission and reception path.

In the radio data communications system according to the embodiment, control point change can be done without impairing the continuity of sequence numbers provided to data fragments (in L2 frame format) to be transmitted to the mobile terminal MN 1 in downlink radio data communications.

As described above, the present invention can provide a radio data communications method, a server and a radio network controller which allow a change of control points located in a network without causing loss of data when the mobile terminal MN 1 is performing a soft handover.

Additional advantages and modifications will readily occur to those skilled in the art. Therefore, the invention in its broader aspects is not limited to the specific details and the representative embodiment shown and described herein. Accordingly, various modifications may be made without departing from the spirit or scope of the general inventive concept as defined by the appended claims and their equivalents.

What is claimed is:

1. A radio data communications method in which at least one of a first radio network controller and a second radio network controller performs a soft handover process for allowing soft handover of a mobile terminal, when the mobile terminal is performing the soft handover, the method including steps of:

changing radio network controllers that perform the soft handover process; and transmitting data as part of the soft handover process in downlink radio data communications in which the first radio network controller transmits data to the mobile terminal via the second radio network controller and a base station, the soft handover processing including the steps of:

determining a first transmission timing of transmitting the data to all base stations to which the mobile terminal is connected when performing the soft handover, determining a second transmission timing of transmitting the data to the second radio network controller, dividing the data and providing a sequence number to each of the data fragments based on a sequence number providing status, transmitting the data fragments to all the base stations at the first transmission timing, transmitting at least a data fragment to the second radio network controller wherein said data fragment is added with information requesting the sequence number providing status, and transmitting the sequence number providing status from the second radio network controller to the first radio network controller, wherein the sequence number providing status includes the number of data fragments having been transmitted since the data fragment added with information requesting the sequence number providing status.

2. The radio data communications method as set forth in claim 1, wherein:

a server determines that the first radio network controller should perform the soft handover process together with the second radio network controller according to a notification from the mobile terminal, when the second radio network controller performs the soft handover process;

the server notifies the first radio network controller and the second radio network controller of the determination;

the first radio network controller takes over a sequence number providing status from the second radio network controller;

the first radio network controller determines a second transmission timing of transmitting the data to the second radio network controller;

the first radio network controller provides the sequence number to each of the data fragments, based on the sequence number providing status;

the first radio network controller transmits the data fragments to the second radio network controller at the second transmission timing, wherein at least a data fragment is added with information requesting the sequence number providing status;

transmitting the sequence number providing status from the second radio network controller to the first radio network controller, wherein the sequence number providing status includes the number of data fragments having been transmitted since the data fragment added with information requesting the sequence number providing status;

the first radio network controller transmits, at the first transmission timing, the data fragments to a base station managed by the first radio network controller among base stations to which the mobile terminal is connected when performing the soft handover; and the second radio network controller transmits, at the first transmission timing, the data fragments from the first radio network controller to a base station managed by the second radio network controller among the base stations to which the mobile terminal is connected when performing the soft handover.

3. The radio data communications method as set forth in claim 1, wherein:

a server determines that the first radio network controller should not perform the soft handover process according to a notification from the mobile terminal, when the first radio network controller and the second radio network controller perform the soft handover process;

the server notifies the first radio network controller and the second radio network controller of the determination;

the first radio network controller transmits the data to the second radio network controller without dividing the data and without providing the sequence number to the data;

the second radio network controller divides the data and provides the sequence number to each of the data fragments based on the sequence number providing status of the first radio network controller, when detecting that the data from the first radio network controller is not divided or is not provided with the sequence number;

the second radio network controller transmits, at the first transmission timing, the data fragments to all base stations to which the mobile terminal is connected when performing the soft handover.

4. The radio data communications method as set forth in claim 1, wherein:

a server determines that the second radio network controller should not perform the soft handover process according to a notification from the mobile terminal, when the first radio network controller and the second radio network controller perform the soft handover process;

the server notifies the first radio network controller and the second radio network controller of the determination;

the first radio network controller divides the data and provides the sequence number to each of the data fragments; and the first radio network controller transmits, at the first transmission timing, the data fragments to all base stations to which the mobile terminal is connected when performing the soft handover.

5. The radio data communications method as set forth in claim 1, wherein:

a server determines that the second radio network controller should perform the soft handover process together with the first radio network controller according to a notification from the mobile terminal, when the first radio network controller performs the soft handover process;

the server notifies the first radio network controller and the second radio network controller of the determination;

the first radio network controller determines a second transmission timing of transmitting the data to the second radio network controller;

the first radio network controller divides the data and provides the sequence number to each of the data fragments;

the first radio network controller transmits the data fragments to the second radio network controller at the second transmission timing, wherein at least a data fragment is added with information requesting the sequence number providing status;

transmitting the sequence number providing status from the second radio network controller to the first radio network controller, wherein the sequence number providing status includes the number of data fragments having been transmitted since the data fragment added with information requesting the sequence number providing status;

the first radio network controller transmits, at the first transmission timing, the data fragments to a base station managed by the first radio network controller among base stations to which the mobile terminal is connected when performing the soft handover; and the second radio network controller transmits, at the first transmission timing, the data fragments from the first radio network controller to base stations managed by the second radio network controller among the base stations to which the mobile terminal is connected when performing the soft handover.

6. The radio data communications method as set forth in claim 1, wherein:

the soft handover process in uplink radio data communications in which a mobile terminal transmits data to the first radio network controller via a base station and the second radio network controller comprising the steps of:

performing selective combining of data fragments from all base stations to which the mobile terminal is connected when performing the soft handover, wherein the selective combining is at least according to the sequence number of the data fragments; and reconstructing the data from the selectively combined data fragments.

7. The radio data communications method as set forth in claim 6, wherein:

a server determines that the first radio network controller should perform the soft handover process together with the second radio network controller according to a notification from the mobile terminal, when the second radio network controller performs the soft handover process;

the server notifies the first radio network controller and the second radio network controller of the determination;

the second radio network controller performs a selective combining of the data fragments from base stations managed by the second radio network controller among base stations to which the mobile terminal is connected when performing the soft handover;

the first radio network controller performs a selective combining of the selectively combined data fragments from the second radio network controller, and the data fragments from a base station managed by the first radio network controller among the base stations to which the mobile terminal is connected when performing the soft handover; and the first radio network controller reconstructs the data from the selectively combined data fragments.

8. The radio data communications method as set forth in claim 6, wherein:

a server determines that the first radio network controller should not perform the soft handover process according to a notification from the mobile terminal, when the first radio network controller and the second radio network controller perform the soft handover process;

the server notifies the first radio network controller and the second radio network controller of the determination;

the second radio network controller performs a selectively combining of the data fragments from base stations managed by the second radio network controller among base stations to which the mobile terminal is connected when performing the soft handover;

the second radio network controller reconstructs the data from the selectively combined data fragments, and notifies the first radio network controller of the fact; and the first radio network controller stops the selective combing and reconstruction of the data fragments in response to the notification from the second radio network controller.

9. The radio data communications method as set forth in claim 6, wherein:

a server determines that the second radio network controller should not perform the soft handover process according to a notification from the mobile terminal, when the first radio network controller and the second radio network controller perform the soft handover process;

the server notifies the first radio network controller and the second radio network controller of the determination;

the second radio network controller stops the selective combining of the data fragments from base stations managed by the second radio network controller among base stations to which the mobile terminal is connected when performing the soft handover, and transfers the data fragments to the first radio network controller;

the first radio network controller performs the selective combining of the data fragments transferred from the second radio network controller, and the data fragments from a base station managed by the first radio network controller among the base stations to which the mobile terminal is connected when performing the soft handover; and the first radio network controller reconstructs the data from the selectively combined data fragments.

10. The radio data communications method as set forth in claim 6, wherein:

a server determines that the second radio network controller should perform the soft handover process together with the first radio network controller according to a notification from the mobile terminal, when the first radio network controller performs the soft handover process;

the server notifies the first radio network controller and the second radio network controller of the determination;

the second radio network controller performs the selective combining of the data fragments from base stations managed by the second radio network controller among base stations to which the mobile terminal is connected when performing the soft handover, in response to the notification from the server;

the first radio network controller performs the selective combining of the selectively combined data fragments from the second radio network controller, and the data fragments from a base station managed by the first radio network controller among the base stations to which the mobile terminal is connected when perfonning the soft handover; and the first radio network controller reconstructs the data from the selectively combined data fragments.

11. A radio network controller for performing a soft handover process for allowing soft handover of a mobile terminal, when the mobile terminal is performing soft handover, in downlink radio data communications in which data is transmitted to the mobile terminal via a base station, the radio network controller comprising:
- a notification receiver configured to receive a notification instructing the radio network controller to perform the soft handover process as a first radio network controller;
- a data divider configured to divide the data in response to the notification;
- a sequence number provider configured to provide a sequence number to each of the data fragments, based on a sequence number providing status, in response to the notification;
- a transmission timing determiner configured to determine a first transmission timing of transmitting the data to a base station managed by the radio network controller among base stations to which the mobile terminal is connected when performing the soft handover, and to determine a second transmission timing of transmitting the data to a second radio network controller, in response to the notification; and
- a data transmitter configured to transmit data fragments to the second radio network controller at the second transmission timing, wherein at least a data fragment is added with information requesting the sequence number providing status, wherein
- the data transmitter is further configured to transmit the data fragments at the first transmission timing to the base stations managed by the radio network controller among the base stations to which the mobile terminal is connected when performing the soft handover, in response to the notification.

12. The radio network controller as set forth in claim 11, wherein:
- the data transmitter adds information requesting the sequence number providing status to the data fragment for transmission to the second radio network controller; and
- the sequence number provider takes over the sequence number providing status, according to a sequence number provided to the data fragment added with the information requesting the sequence number providing status notified by the second radio network controller, and the number of data fragments transmitted until receiving the sequence number since transmitting the data fragment added with the information requesting the sequence number providing status.

13. A radio network controller for performing a soft handover process for allowing soft handover of a mobile terminal, when the mobile terminal is performing the soft handover, in uplink radio data communications in which the mobile terminal transmits data via a base station, the radio network controller comprising;
- a notification receiver configured to receive a notification instructing the radio network controller to perform the soft handover process as a first radio network controller;
- a selective combiner configured to perform selective combining of data fragments from all base stations to which the mobile terminal is connected when performing the soft handover, in response to the notification, wherein the selective combining is performed at least according to the sequence number in each of the data segments; and
- a reconstructor configured to reconstruct the data from the selectively combined data fragments, in response to the notification.

14. A radio network controller for performing a soft handover process for allowing soft handover of a mobile terminal, when the mobile terminal is performing the soft handover, in uplink radio data communications in which the mobile terminal transmits data via a base station, the radio network controller comprising:
- a notification receiver configured to receive a notification instructing the radio network controller to perform the soft handover process;
- a selective combiner configured to perform selective combining of data fragments from base stations managed by the radio network controller among all base stations to which the mobile terminal is connected when performing the soft handover, in response to the notification, wherein the selective combining is performed at least according to the sequence number in each of the data segments; and
- a data transmitter configured to transmit the selectively combined data fragments to a first radio network controller in response to the notification.

* * * * *